(12) United States Patent
Colenbrander

(10) Patent No.: US 10,773,156 B2
(45) Date of Patent: Sep. 15, 2020

(54) SYSTEMS AND METHODS FOR ESTABLISHING DIRECT COMMUNICATION BETWEEN A SERVER SYSTEM AND A VIDEO GAME CONTROLLER

(71) Applicant: Sony Interactive Entertainment LLC, San Mateo, CA (US)

(72) Inventor: Roelof Roderick Colenbrander, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 29 days.

(21) Appl. No.: 16/181,211

(22) Filed: Nov. 5, 2018

(65) Prior Publication Data

US 2020/0139231 A1    May 7, 2020

(51) Int. Cl.
*A63F 13/23* (2014.01)
*A63F 13/77* (2014.01)
*A63F 13/79* (2014.01)
*H04L 29/06* (2006.01)

(52) U.S. Cl.
CPC .............. *A63F 13/23* (2014.09); *A63F 13/77* (2014.09); *A63F 13/79* (2014.09); *H04L 65/1069* (2013.01)

(58) Field of Classification Search
CPC .......... A63F 13/23; A63F 13/77; A63F 13/79; H04L 65/1069
See application file for complete search history.

(56) References Cited

U.S. PATENT DOCUMENTS

| 6,511,378 B1* | 1/2003 | Bhatt | A63F 13/06 463/36 |
| 2005/0147247 A1* | 7/2005 | Westberg | H04N 21/4122 380/200 |
| 2008/0261686 A1 | 10/2008 | Bedingfield | |
| 2010/0317443 A1* | 12/2010 | Cook | A63F 13/12 463/42 |
| 2014/0179426 A1* | 6/2014 | Perry | A63F 13/10 463/31 |

(Continued)

FOREIGN PATENT DOCUMENTS

EP    2261809 A1    12/2010

OTHER PUBLICATIONS

PCT/US2019/053895, International Search Report, PCT/ISA/210, European Patent Office, NL, dated Nov. 14, 2019.

*Primary Examiner* — Corbett B Coburn
(74) *Attorney, Agent, or Firm* — Penilla IP, APC

(57) ABSTRACT

Systems and methods for establishing direct communication between a server system and a video game controller are described. The systems and methods include the video game controller and a computing device. An application is executed by the server system when a session is established by the computing device with the server system. Once the application is executed, the video game controller is used to send an identifier to the server system. The server system verifies the identifier to pair the session with the video game controller. When the video game controller is paired with the session, the video game controller can be used to change a state of a virtual scene that is displayed on the computing device or on a display screen.

22 Claims, 16 Drawing Sheets

(56) References Cited

U.S. PATENT DOCUMENTS

| | | | | |
|---|---|---|---|---|
| 2014/0357372 A1* | 12/2014 | Garcia | ............ | A63F 13/22 |
| | | | | 463/37 |
| 2017/0072307 A1* | 3/2017 | Perry | ............ | A63F 13/355 |
| 2017/0142201 A1* | 5/2017 | Holmes | ............ | A63F 13/355 |
| 2018/0001205 A1* | 1/2018 | Osman | ............ | A63F 13/5375 |
| 2019/0321732 A1* | 10/2019 | Zimring | ............ | A63F 13/335 |

\* cited by examiner

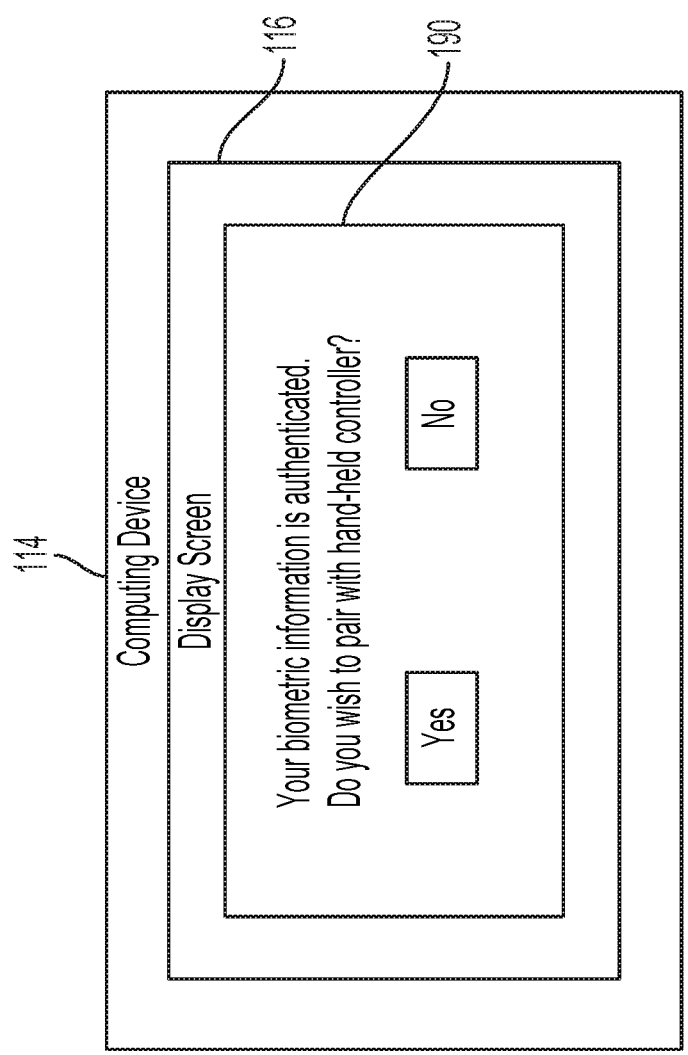

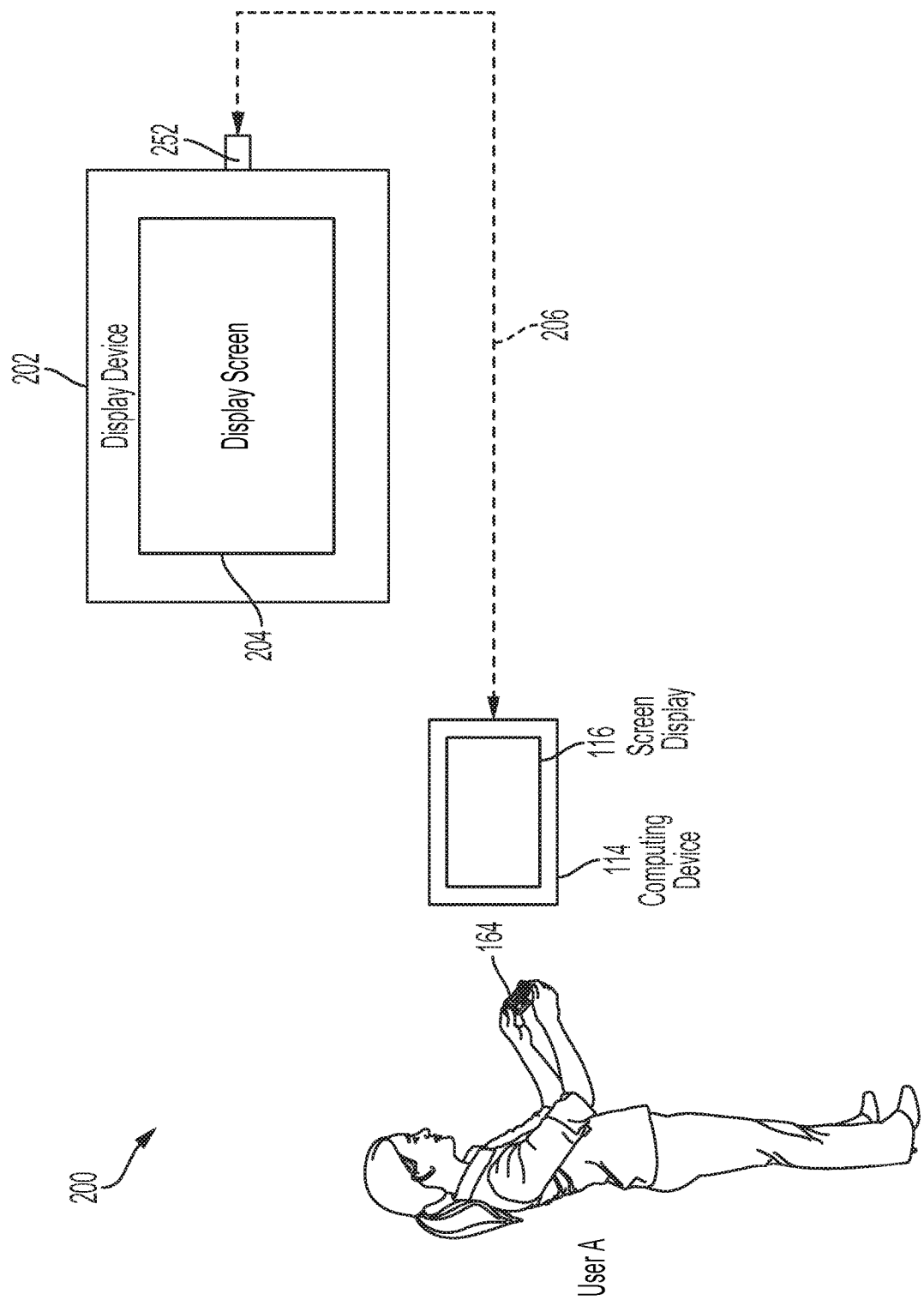
FIG. 2 (Screen Mirroring)

SYSTEMS AND METHODS FOR ESTABLISHING DIRECT COMMUNICATION BETWEEN A SERVER SYSTEM AND A VIDEO GAME CONTROLLER

FIELD

The present disclosure relates to systems and methods for establishing direct communication between a server system and a video game controller.

BACKGROUND

Generally, a game is accessed for play via a game console. The game console is coupled to a game controller. A gamer connects the game console to a television. The game or an update for the game is downloaded from a server to the game console and the gamer plays the game using the game controller.

It is in this context that embodiments described in the present disclosure arise.

SUMMARY

Embodiments described in the present disclosure provide systems and methods for establishing direct communication between a server system and a video game controller.

In some embodiments, the systems and methods described herein provide a manner in which the video game controller can be used with any display device that is coupled to a computer network. There is no need to use a game console to access an application that is executed on the server system. For example, the video game controller can be used with a computing device, such as a cell phone, or a tablet, or a television. There is no need to use the game console. A session of execution of the application is accessed using the computing device. Once the session is accessed, an identifier that is associated with the video game controller is sent to the server system. The server system verifies the identifier. Upon verifying the identifier, the server system determines to pair the video game controller with the session. Once the video game controller is paired with the session, the video game controller can be used by a user to change a state of a virtual scene that is displayed on the computing device.

Some advantages of the herein described systems and methods for establishing direct communication between the server system and the video game controller include that there is no need to use the game console between the video game controller and the server system. The user accesses the session by providing his/her login information. Once the session between the computing device and the server system is established, the identifier associated with the video game controller is sent from the video game controller to the server system. When the identifier is verified by the server system, the server system pairs the video game controller with the session and the user is allowed to change the state of the virtual scene that is displayed on the computing device or another display device. Hence, there is no need for use of the game console to use the video game controller. The video game controller can be used regardless of whether the game console is used to access the virtual scene generated by executed of the application stored on the server. The non-use of the game console reduces a number of hops between the video game controller and the server system. Each hop is used to receive the data, analyze the data to determine its destination address, and send the data to the destination address. By removing the game console, a hop associated with the game console is reduced. The reduction of a number of hops between the video game controller and the server system decreases latency time between the video game controller and the server system and provides for faster game play.

Other aspects described will become apparent from the following detailed description, taken in conjunction with the accompanying drawings, illustrating by way of example the principles of embodiments described in the present disclosure.

BRIEF DESCRIPTION OF THE DRAWINGS

Various embodiments described in the present disclosure may best be understood by reference to the following description taken in conjunction with the accompanying drawings in which:

FIG. 1F-1 is a diagram of an embodiment of a pairing-request notification that is displayed on a display screen of a computing device.

FIG. 1F-2 is a diagram of an embodiment of a controller to illustrate a display of a pairing-request notification on a display screen of a controller.

FIG. 2 is a diagram of an embodiment of a system to illustrate a mirroring effect of the computing device.

DETAILED DESCRIPTION

Systems and methods for establishing direct communication between a server system and a video game controller are described herein.

It should be noted that various embodiments described in the present disclosure may be practiced without some or all of these specific details. In other instances, well known process operations have not been described in detail in order not to unnecessarily obscure various embodiments described in the present disclosure.

Figure 1A:
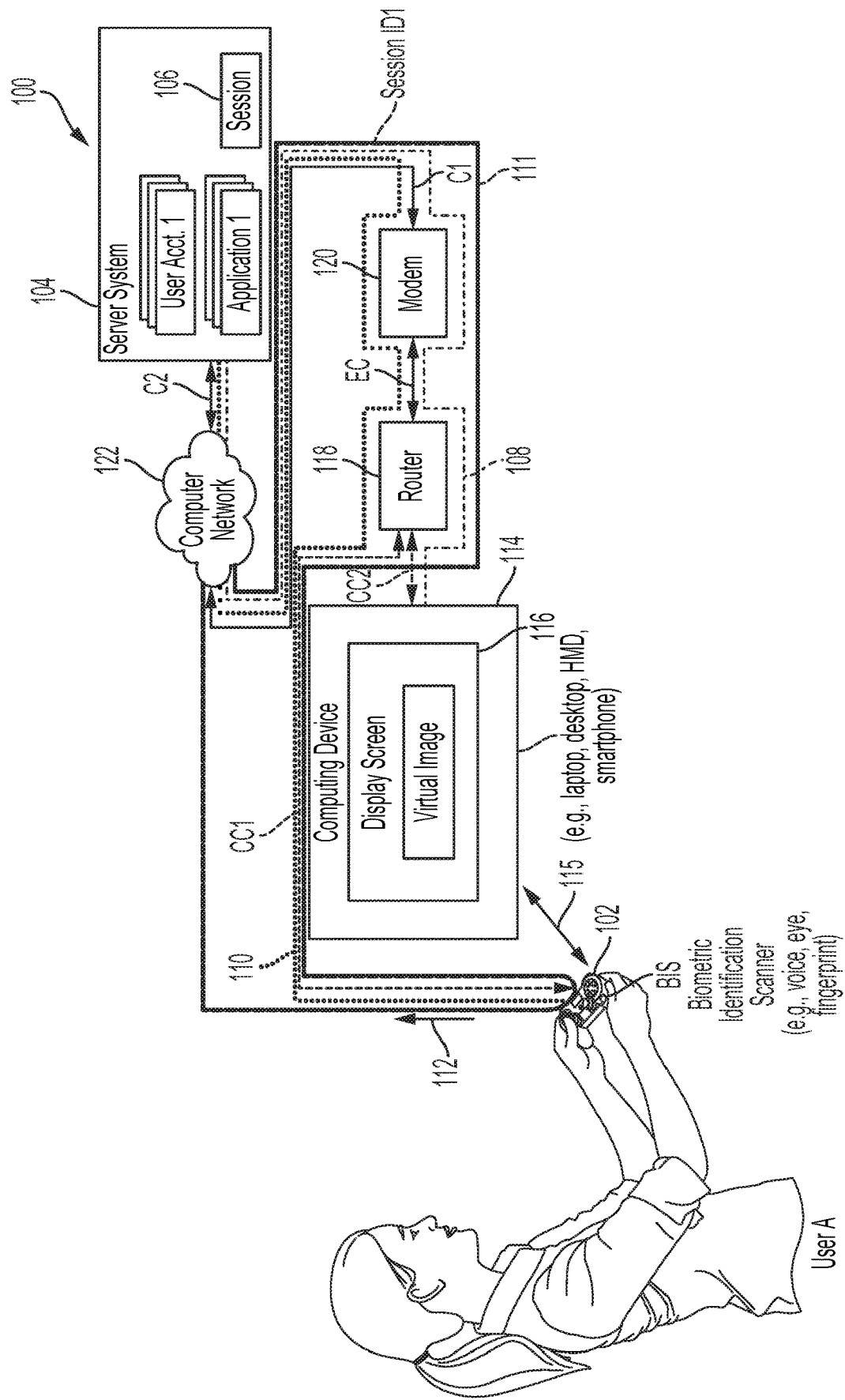
FIG. 1A is a diagram of an embodiment of a system to illustrate pairing of a controller with a session.

FIG. 1A is a diagram of an embodiment of a system 100 to illustrate pairing of a controller 102 with a session 106. Examples of the controller 102 include a hand-held controller, which can be a Sony™ DualShock™ controller, a gun-shaped controller, a PlayStation™ Move™ controller, a stick-shaped controller, a cellular phone, a mobile device, a tablet, a video game controller, a joystick, a glove-shaped controller, or a steering wheel-shaped controller, etc. Examples of the session 106 include a game session, a video session, a virtual image session, an augmented reality image session, a virtual reality image session, etc. As an illustration, the session 106 is an instance of execution of an application 1, which can be a game execution application that allows a play of a game application or a video conferencing application that allows images of a real-world environment to be transferred via the computer network 122 between two clients. Examples of the real-world environment include a room or a confined location or an enclosed environment or an environment that is enclosed by walls or a cubicle. The session 106 starts when a user A logs into a user account 1 and ends when the user A logs out of the user account 1. For example, an instance of execution of the session 106 starts when the user A logs into his/her user account 1 and ends for the user account 1 when the user A logs out of the user account 1. The logging out by the user A disables game play by the user A and the logging in by the user A into the user account 1 is performed to enable the game play. The user A logs out of the user account 1 by selecting a button on the controller 102 or another controller, described herein.

The system 100 includes the controller 102, a computing device 114, a computer network 122, a server system 104, a router 118, and a modem 120. As an example, the router 118 and the modem 120 are locally situated with respect to the controller 102. For example, the router 118 and the modem 120 are situated in the same real-world environment in which the controller 102 is situated.

The computing device 114 is a machine for performing calculations. Examples of the computing device 114 include a smart television, a tablet, a smart phone, a head-mounted display (HMD), an electronic computer, an information processing system, a desktop computer, and a laptop computer. Another example of the computing device 114 includes a combination of a display device and a game console. The display device is coupled to the game console. The computer network 122 is a group of computing hardware devices that are linked together through communication channels to facilitate communication and resource sharing among users. The computer network 122 can be a wide area network or a local area network or a combination of the wide area network and the local area network. Internet is an example of the wide area network and Intranet is an example of the local area network.

The server system 104 includes a single or multiple servers that execute the application 1 and other applications. For example, each server includes a server operating system (OS) that is designed to run on the server. Each server is a specialized computer that serves requests from a client, such as a computing device or a controller or a display device, described herein. The specialized computer includes a processor and a memory device. The processor is coupled to the memory device. As used herein, terms, such as a processor, an application specific integrated circuit (ASIC), a programmable logic device (PLD), and a central processing unit (CPU), a server, a microprocessor, are used herein interchangeably. Examples of a memory device include a read-only memory and a random access memory. To illustrate, the memory device is a flash memory, a hard disk drive, or a redundant array of independent disks (RAID).

The modem 120 is a device that performs modulation and demodulation of data to allow the client to connect to the computer network 122. As an example, the modem 120 applies a network communication protocol, such as Transmission Control Protocol (TCP/IP) to extract data from transfer packets. The modem 120 applies the network communication protocol to embed data into transfer packets. An example of the modem 120 is a broadband modem that allows the client to access the Internet via a cable or a digital subscriber line (DSL). The modem 120 routes a data signal received from the router 118 to the server system 104 via the computer network 122. In addition, the modem 120 routes a data signal received from the server system 104 via the computer network 122 to the router 118. The modem 120 is coupled at one end to a cable or the DSL, which is coupled to the computer network 122. In one embodiment, the terms data and information are used herein interchangeably.

The router 118 directs a data signal that is received from the server system 104 via the computer network 112 to the computing device 114 or the controller 102 based on a destination address received by the router 118 with the data signal. For example, the router 118 determines that the data signal has a destination address of the computing device 114 and directs the data signal to the computing device 114 assigned the destination address. An example of a destination address is an Internet Protocol (IP) address or a media access layer (MAC) address or a combination thereof. The destination address of the computing device 114 is different from the destination address of the controller 102. For example, at least one alphanumeric character of the destination address of the controller 102 is different from at least one alphanumeric character of the destination address of the computing device 114. The router 118 determines that another data signal has a destination address of the controller 102 and directs the other data signal to the controller 102. An example of the router 118 is a broadband router. The computing device 114 has a display screen 116, such as a liquid crystal display (LCD) screen, a light emitting diode (LED) display screen, or a plasma display screen, which is a display part of a monitor or a display device.

The server system 104 stores multiple user accounts 1 through N. Each user account is assigned to a user. For example, the user account 1 is assigned to the user A and another user account 2 is assigned to another user B.

The controller 102 is coupled to the router 118 via a connection channel CC1. An example of the connection channel CC1 is a wireless connection, such as a wireless local area network (LAN) or a Wi-Fi connection or a Bluetooth™ connection. Wi-Fi is a wireless networking technology that uses radio waves or electromagnetic waves to provide a wireless high-speed connection to the computer network 122. Similarly, the computing device 114 is connected to the router 118 via a connection channel CC2, which is also a wireless connection. The connection channel CC1 or CC2 can be a radio frequency and has a specific data rate, measured in bits per second, and a bandwidth, measured in hertz. An example of each of the connection channel CC1 and CC2 is a wireless connection channel that applies a wireless communication protocol, such as Wi-Fi™ or Bluetooth™. The connection channel CC2 of the computing device 114 with the router 118 is different from the connection channel CC1 of the controller 102 with the router 118. For example, the wireless connection of the computing device 114 with the router 118 has a different data transfer rate between the computing device 114 and the router 118 compared to a data transfer rate between the controller 102 and the router 118.

The router 118 is coupled to the modem 120 via an Ethernet cable EC. The modem 120 is coupled to the computer network 122 via a connection C1 and the server system 104 is coupled to the computer network 122 via another connection C2. The connection C1 includes a group of cables or digital subscriber lines and the connection C2 includes a gateway device and a group of cables or digital subscriber lines. A combination of the connection channel CC1, the router 118, the cable EC, the modem 120, and the connection C1 is sometimes referred to herein as a connection channel 111.

The user A powers on the computing device 114 and accesses the user account 1. For example, the user A accesses a login website from the server system 104 via the computer network 122. The user A uses an input device, such as a keyboard or a pad or a mouse, of the computing device 114 to provide his/her login information, which can include a username and a password, assigned to the user A. The login information is sent from the computing device 114 via the connection channel CC2 to the router 118. The router 118 sends the login information to the modem 120 via the cable EC. The modem 120 generates one or more transfer packets embedding the login information and sends the transfer packets via the connection C1, the computer network 122, and the connection C2 to the server system 104.

A server of the server system 104 determines that the login information is authentic and provides access to the user account 1 and establishes the session 106. To establish the session 106, the server system 104 executes an instance of the application 1 and sends one or more transfer packets that include information associated with the session 106 to the computing device 11 via the connection C2, the computer network 122, the connection C1, the modem 120, the cable EC, the router 118, and the connection channel CC2. An example of the information associated with the session 106 includes information identifying the application 1, such as a name of the application 1 that is allowed access upon providing access to the user account 1, a title of the application 1, or virtual image data that identifies the application 1, or audio data that identifies the application 1, or a combination of two or more thereof. To illustrate, the information associated with the session 106 has image data for displaying an introductory image of a video game at the computing device 114 and audio data that is synchronized to the display of the introductory image. As another illustration, the information associate with the session 105 includes a uniform resource locator (URL) of a gaming website accessed to view features of and to play the video game. Another example of the information associated with the session 105 includes a notice that the user A provides his/her biometric information via the controller 102 by using a biometric information scanner BIS of the controller 102. To illustrate, the information associated with the session 106 includes the notice that the user A press his/her finger against a fingerprint reader on the controller 102 or that the user A speak into a microphone of the controller 102 or that the user A scan his/her eye into a biometric eye scanner of the controller 102. Examples of a biometric information scanner include the fingerprint reader, the microphone, and the biometric eye scanner. Another example of the information associated with the session 105 includes the information identifying the application 1 and the notice that the user A provides his/her biometric information via the controller 102. The biometric information is unique to the user A and distinguishes the user A from other users. Yet another example of the information associated with the session 106 includes the information identifying the application 1 and an instruction to be sent to the controller 102 to provide its device identification (ID). Examples of the device ID include a serial number of the controller 102, a MAC address of the controller 102, and a combination thereof. The device ID of the controller 102 is unique to the controller 102 and distinguishes the controller 102 from other controllers, which can be the same in structure and function as the controller 102. Still another example of the information associated with the session 106 includes the information identifying the application 1 and an instruction to be sent to the controller 106 to provide a network identification (ID). Examples of the network ID include a network address of the router 118. The network ID stored within the controller 102 is unique to the router 118 and distinguishes the router 118 from other routers.

One or more transfer packets having the information associated with the session 106 and sent from the server system 104 also include a destination address of the router 118 and one or more additional destination addresses, such as the destination address of the computing device 114 and the destination address of the controller 102. Upon receiving the transfer packets including the information associated with the session 106, the modem 120 applies the network communication protocol to depacketize the transfer packets to identify the destination address of the router 118, the destination address of the computing device 114, the destination address of the controller 102, and the information associated with the session 106. It should be noted that the destination address of the controller 102 is pre-stored in a memory device of the server system 104. For example, when the user A makes an in-person purchase of the controller 102, the user A provides his/her user account information to an entity that sells the controller 102 to the user A. The entity makes a selection via an input device of a client device to register the controller 102 with the user account 1. Upon receiving a signal generated based on the selection from the client device, one or more processors, described herein, of the server system 104 register a device ID of the controller 102 with the user account 1 to register the controller 102 with the user account 1. To illustrate, the one or more processors of the server system 104 stores a link between the user account 1 and a device ID of the controller 102 within a mapping database, described below. As another example, when the user A makes an online purchase of the controller 102, the user A provides his/her user account information to a website, such as a retailer website or a manufacturer website, accessed by the user A for the purchase. The user account information is sent from the website to the server system 104 for the one or more processors to register the controller 102 with the user account 1. Examples of the user account information include an email address used by accessing the user account 1 of the user A, a user name assigned to the user account 1, a residence address associated with the user account 1, or a phone number associated with the user account 1, or a combination thereof. The modem 120 sends the destination address of the computing device 114, the destination address of the controller 102, and the information associated with the session 106 via the cable EC to the router 118.

Upon receiving the destination address of the computing device 114 and the information associated with the session 106, the router 118 determines that the information associated with the session 106 is to be sent to computing device 114 and sends the information associated with the session 106 to the computing device 114 via the connection channel CC2. A combination of the connection channel CC2, the router 118, the cable EC, the modem 120, the connection C1, the computer network 122, the connection C2 is referred to herein as a communication channel 108, which is illustrated using long and short dashed lines "- - -".

Similarly, upon receiving the destination address of the controller 102 and the information associated with the session 106, the router 118 determines that the information associated with the session 106 is to be sent to controller 102 and sends the information associated with the session 106 to the controller 102 via the connection channel CC1. A combination of the connection channel CC1, the router 118, the cable EC, the modem 120, the connection C1, the computer network 122, the connection C2 is referred to herein as a communication channel 110, which is illustrated using "o"s.

Upon receiving the information associated with the session 106, the computing device 114 displays the information on the display screen 116 or outputs the audio data within the information associated with the session 106 via one or more speakers of the computing device 114 or both displays the information and outputs the audio data. Upon reading the information associated with the session 106 displayed on the display screen 116 or listening to the audio data, the user A provides his/her biometric ID, such as voice or fingerprint, or retinal information, to the biometric information scanner BIS. For example, the user A says "Hey Controller" to provide his/her voice to the biometric information scanner BIS.

In case the information associated with the session 106 includes the instruction for the controller 102 to provide its device ID, the controller 102 accesses the device ID from a memory device of the controller 102. Also, in case the information associated with the session 106 includes the instruction for the controller 102 to provide the network ID, the controller 102 accesses the network ID from a memory device of the controller 102. The biometric ID or the device ID or the network ID a combination of two or more thereof is referred to herein as identification information.

The identification information and an instruction to provide the identification information to a destination address of the server system 104 is sent from the controller 102 via the communication channel CC1 to the router 118. As an example, the URL of the gaming website is stored in firmware of a read-only memory or in another memory device of the controller 102. The URL includes the destination address of the server system 104. As another example, the computing device 114 provides the URL of the server system 104 via the wireless connection 115 to the controller 102. The computing device 114 or another device, such as the game console, is bypassed or not used in sending the identification information. For example, the identification information is not sent from the controller 102 to the computing device 114 or the game console. As another example, the identification information is not addressed by the controller 102 to be sent to the computing device 114 or to the game console. The identification information is addressed by the controller 102 to be sent to the server system 104. The computing device 114 is coupled to the controller 102 via a wireless connection 115, such as a Bluetooth™ connection or a Bluetooth™ connection or another short-range connection.

The router 118 receives the identification information and the instruction via the communication channel CC1, identifies the destination address of the server system 104 within the instruction, and routes the identification information to the modem 120 via the cable EC. The modem 120 receives the identification information and the instruction, identifies the destination address of the server system 104 within the instruction, applies the network communication protocol to the identification information to generate transfer packets and sends the transfer packets via the connection C1, the computer network 122, and the connection C2 to the server system 104. The server system 104 receives the identification information and pairs the controller 102 with the session 106 upon verifying that the identification information.

The server system 104 generates and sends a pairing notification in response to pairing the controller 102 with the session 106. For example, the pairing notification includes image frames to be displayed on the computing device 114, or audio frames to be output as sound by the computing device 114, or a combination thereof. The image frames include information for displaying the pairing notification, such as color and intensity and texture of the pairing notification. As another example, the pairing notification includes an instruction to a rendering program that is executed by a graphical processing unit (GPU) of the computing device 114, or an instruction to an audio processor of the computing device 114 for processing audio data, or both the instructions. The server system 104 sends the pairing notification via the connection C2, the computer network 122, the connection C1, the modem 120, the cable EC, the router 108, and the connection channel CC2 to the computing device 114. The modem 120 receives one or more transfer packets including the pairing information and a destination address of the computing device 114 from the server system 104 via the connection C2, the computer network 122, and the connection C1. The modem 120 applies the network communication protocol to the transfer packets to extract the destination address of the computing device 114 and the pairing notification, and sends the pairing notification and the destination address to the router 118 via the cable EC. The router 118 determines from the destination address of the computing device 114 that the pairing notification is to be sent to the computing device 114, and sends the pairing notification to the computing device 114 via the connection channel CC2. For example, the router 118 identifies from an IP address of the computing device 114 that the pairing notification is to be sent to the computing device 114. Upon receiving the pairing notification that includes the image frames or audio frames or a combination thereof, the pairing information is output as one or more images on the display screen 116 of the computing device 114 or as sound via one or more speakers of the computing device 114 or a combination thereof. Upon receiving the pairing information that includes the instruction to the rendering program. the GPU of the computing device 114 executes the rendering program to display the pairing notification on the display screen 116. Also, when the pairing notification includes the instruction to the audio processor, the audio processor and one or more speakers of the computing device 114 execute the instruction to process the audio data to output the audio data as sound. Similarly, when the pairing notification includes both the instructions, both the GPU and the audio processor synchronize with each other to output the pairing notification as images and sound.

Once the session 106 is paired, such as linked or associated with, with the controller 102, the controller 102 can be used by the user A to interact with the session 106 to establish a direct communication between the server system 104 and the controller 102. For example, the controller 102 can be used by the user A to play the game generated by executing the application 1. To illustrate, the controller 102 can be used by the user A to provide input data, such as controller movement data, controller button presses, etc., to the server system 104 via the communication channel 110 to change a state of a virtual scene being displayed on the computing device 114.

Before the session 106 is paired with the controller 102, the controller 102 cannot be used by the user 102 to interact with the session 106 of execution of the application 1 to change the state of the virtual scene displayed on the computing device 114. For example, the user A selects or moves an input device of the controller 102. The selection or movement of the input device generates input information, which is not processed by or disallowed the server system 102 to change the state of the virtual scene. The input information transferred from the controller 102 to the server system 102 via the communication channel 110 for changing the state of the virtual scene generated by execution of the application 1 is not processed by the server system 104 for changing the state of the virtual scene until the controller 102 is paired with the session 106.

In one embodiment, in a multi-player game, such as a multi-player race car game or a soccer game, the logging out by the user A from the user account 1 does not affect other instances of execution of the session 106 for other users also playing the game. The instances of the session 106 for the other users continue until they log out of their corresponding user accounts.

In an embodiment, the user A physically transfers the controller 102 or another controller, described herein, to another user. If the other user uses the user account 1 assigned to the user A, the instance of the session 106 associated with the user account 1 continues. However, if the other user users his/her user account 2 after logging out of the user account 1, another instance of the session 106 initiates for the user account 2.

In one embodiment, the session 106 ends when the computing device 114 on which the virtual scene is being displayed is disconnected from the server system 104 or when the computing device 114 is powered off, or a communication signal between the computing device 114 and the server system 104 is weak, e.g., has an amount of power that is less than a threshold, or a communication device of the computer network 122 is not functional or is malfunctioning, or a communication device of the computing device 114 is not functional or is malfunctioning.

In an embodiment, both the router 118 and the modem 120 are integrated into a single hardware device.

In one embodiment, the connection channel CC2 is a wired connection channel, such as a coax cable. Similarly, the connection channel CC1 is a wired connection.

In an embodiment, functions described herein as being performed by the server system 104 are performed by one or more processors of the server system 104. Similarly, in an embodiment, functions described herein as being performed by the modem 120 are performed by one or more processors of the modem 120. Also, in an embodiment, functions described herein as being performed by the router 118 are performed by one or more processors of the router 118. In one embodiment, functions described herein as being performed by the controller 102 are performed by one or more processors of the controller 102.

In an embodiment, a pairing notification, described herein, is not sent from the server system 104 to the computing device 114.

In one embodiment, the computing device 114 is not coupled to the controller 102 via the wireless connection 115.

In one embodiment, the controller 102 sends a request to the computing device 114 to obtain the destination address of the server system 104 before sending the identification information to the server system 104. For example, The computing device 114 requests that the wireless connection 115 occur between the computing device 114 and the controller 102. Once the wireless connection 115 is established, the controller 102 sends a request to the server system 104 via the wireless connection 115 for obtaining the destination address. Upon receiving the request, the computing device 114 provides the destination address of the server system 104 to the controller 102 via the wireless connection 115.

In an embodiment, the session 106 does not end when another user uses the controller 102. The other user receives the controller 102 from the user A while the session 106 is active after being initiated. The other user provides his/her login information to the server system 104 via the computing device 114 to log into his/her user account to initiate another instance of the session 106 for the user account of the other user. The session 106 remains active and does not end when the other user switches to his/her account from the user account 1.

Figure 1B:
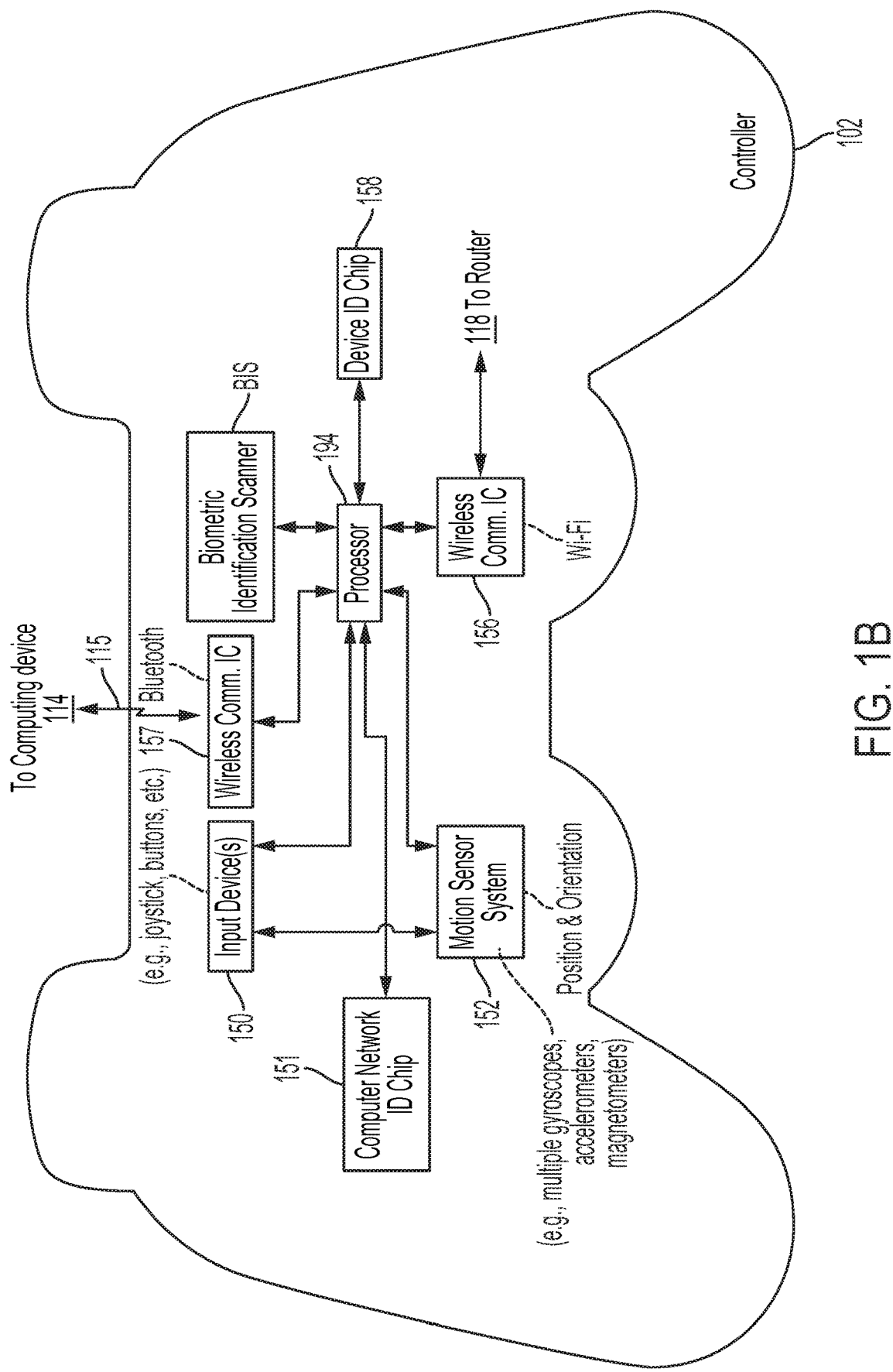
FIG. 1B is a diagram of an embodiment of the controller to illustrate wireless communication of the controller with a router.

FIG. 1B is a diagram of an embodiment of the controller 102 to illustrate wireless communication of the controller 102 with the router 118. The controller 102 includes a motion sensor system 152, a wireless communication integrated circuit (IC) 156, an input device 150, a computer network ID chip 151, a wireless communication IC 157, the biometric identification sensor BIS, a processor 194, and a device ID chip 158. The processor 194 is coupled to the motion sensor system 152, wireless communication integrated circuit (IC) 156, the input device 150, the computer network ID chip 151, the wireless communication IC 157, the biometric identification sensor BIS, and the device ID chip 158. The input device 150 is coupled to the motion sensor system 152. Examples of the motion sensor system 152 include one or more gyroscopes, one or more accelerometers, and one or more magnetometers to facilitate a determination of a position and orientation of the controller 102 and to facilitate a determination of changes to the position and orientation. Examples of the input device 150 include a button, a switch, a touch screen, a stylus, a joystick, a microphone, a gun trigger, etc. Examples of the wireless communication IC 157 include a Bluetooth™ device or a Wi-Fi™ device that enables communication between the controller 102 and the computing device 114 (FIG. 1A) via the wireless connection 115 (FIG. 1A). To illustrate, a Bluetooth™ device includes a processor that facilitates a transfer of data over short distances using short-wavelength ultra high frequency (UHF) radio waves in an industrial, scientific, and medical (ISM) band from 2.4 to 2.485 GHz between a controller and another device, such as a computing device, building personal area networks (PANs).

The device ID chip 158 is a memory chip that stores the device ID, such as a MAC address or a unique identification number, of the controller 102. For example, the device ID chip 158 stores a sequence of alphanumeric characters, which are unique to the controller 102 and distinguishes the controller 102 from other controllers. An example of the wireless communication IC 156 includes a Wi-Fi™ device that allows Wi-Fi™ communication between the controller 102 and the router 118 via the connection channel CC1 (FIG. 1A). To illustrate, the wireless communication IC 156 is a network interface card (NIC) that couples a controller, as described herein, via the connection channel CC1 and the router 118 to the computer network 122.

The computer network ID chip 151 is another memory chip that stores the network ID, such as an Internet Protocol (IP) address, of the router 118 of FIG. 1A. The router 118 is identified within the computer network 122 using the network ID stored in the computer network ID chip 151. For example, the computer network ID chip 151 stores a sequence of alphanumeric characters, which are unique to the router 118 and distinguishes the router 118 from other routers within the computer network 122.

The device ID of the controller 102 and the other corresponding device IDs of the other controllers are pre-registered with the server system 104 before the session 106 (FIG. 1A) starts. For example, the device ID unique to the controller 102 is hardwired into the controller 102 and the server system 104 stores the device ID. The device ID of the controller 102 and additional device IDs of the other controllers are stored in a device ID database of the server system 104. The device ID database is stored in one or more memory devices of the server system 104.

Also, the network ID identifying the router 118 is pre-registered with the server system 104 before the controller 102 sends the identification information to the server system 104 to pair the controller 102 with the session 106. For example, during establishment of the session 106, the server system 104 sends an instruction to the computing device 114 via the communication channel 108 to provide the network ID. Upon receiving the instruction, the computing device 114 accesses the network ID stored in a memory device of the computing device 114, and sends the network ID via the communication channel 108 (FIG. 1A) to the server system 104. The server system 104 receives the network ID and stores the network ID in a network ID database of the server system 104. The network ID database is stored in one or more memory devices of the server system 104. Also, the server system 104 associates, such as establishes a one-to-one correspondence or a link, between the network ID and the user account 1 after the session 106 is established.

Moreover, the biometric ID identifying the user A is pre-registered with the server system 104 before the controller 102 sends the identification information to the server system 104 to pair the controller 102 with the session 106. For example, the computing device 114 has a biometric information scanner. After the session 106 is established or while the session 106 is being established, the server system 104 sends an instruction to the computing device 114 via the communication channel 108 to request the biometric ID from the user A. When the computing device 114 receives the instruction, the computing device 114 displays a message or output a sound to request the biometric ID from the user A. Upon receiving the biometric ID via the biometric information scanner of the computing device 114 from the user A, the computing device 114 sends the biometric ID via the communication channel 108 to the server system 104. The server system 104 receives the biometric ID and stores the biometric ID in a biometric ID database of the server system 104. The biometric ID database is stored in one or more memory devices of the server system 104. Also, the server system 104 associates, such as establishes a one-to-one correspondence or a link, between the biometric ID and the user account 1.

After the session 106 is established between the computing device 114 and the server system 104, the user A provides his/her biometric ID to the biometric identification scanner BIS of the controller 102 to pair the controller 102 with the session 106. For example, after the session 106 starts, upon viewing the notice that the user A press his/her finger against a fingerprint reader on the controller 102 or that the user A speak into the microphone of the controller 102 or that the user 102 scan his/her eye into the biometric eye scanner of the controller 102, the user A provides his/her biometric information to the biometric information scanner BIS of the controller 102. Upon receiving the biometric ID, the biometric identification scanner BIS of the controller 102 generates a biometric identification signal and sends the biometric identification signal to the processor 194. The processor 194 receives the biometric identification signal and generates an instruction to send the biometric identification signal to the server system 104. For example, the instruction includes a destination address of the server system 104. The processor 194 sends the instruction and the biometric identification signal to the wireless communication IC 156. The wireless communication IC 156 applies the wireless communication protocol to the biometric identification signal and the instruction and sends the biometric identification signal and the instruction via the connection channel CC1 (FIG. 1A) to the router 118. The router 118 determines from the destination address within the instruction that the biometric identification signal is to be sent to the server system 104 and sends the instruction and the biometric identification signal to the modem 120. The modem 120 applies the network communication protocol to the biometric identification signal to generate one or more transfer packets and sends the transfer packets via the connection C1, the computer network 122, and the connection C2 to the server system 104. The transfer packets having the biometric identification signal is an example of a connection request.

As an alternative or in addition to sending the biometric identification signal after the session 106 is established between the computing device 114 and the server system 104, the processor 194 accesses the device ID from the device ID chip 158 and generates an instruction to send the device ID to the server system 104 to pair the controller 102 with the session 102. The processor 194 sends the instruction and the device ID to the wireless communication IC 156. The wireless communication IC 156 applies the wireless communication protocol to the device ID and the instruction and sends the device ID and the instruction via the connection channel CC1 (FIG. 1A) to the router 118. The router 118 determines from the instruction that the device ID is to be sent to the server system 104 and sends the instruction and the device ID to the modem 120. The modem 120 generates one or more transfer packets having the device ID and sends the transfer packets via the connection C1, the computer network 122, and the connection C2 to the server system 104. The transfer packets having the device ID is another example of the connection request.

Also, as an alternative or in addition to sending the biometric identification signal after the session 106 starts, or as an alternative or in addition to sending the device ID after the session 106 starts, the processor 194 accesses the network ID from the computer network ID chip 151 and generates an instruction to send the network ID to the server system 104 to pair the controller 102 with the session 106. The processor 194 sends the instruction and the network ID to the wireless communication IC 156. The wireless communication IC 156 applies the wireless communication protocol to the network ID and the instruction and sends the network ID and the instruction via the connection channel CC1 to the router 118. The router 118 determines from the instruction that the network ID is to be sent to the server system 104 and sends the instruction and the network ID to the modem 120. The modem 120 generates one or more transfer packets from the network ID and sends the transfer packets via the connection C1, the computer network 122, and the connection C2 to the server system 104. The transfer packets having the network ID is yet another example of the connection request.

It should be noted that the connection request is not sent via the game console or the computing device 114. There is no use of the game console or the computing device 114 in transferring the connection request from the controller 102 to the server system 104.

Once the device ID, or the biometric ID, or the network ID, or a combination of two or more thereof is used by the server system 104 to pair the controller 102 with the session 106, the controller 102 can be used by the user A to generate and provide inputs for changing the state of the virtual scene that is displayed upon execution of application 1. For example, once the controller 102 is paired with the server system 104, the user A can use the controller 102 to change the state of the virtual scene. The user A uses the controller 102 by selecting or moving the input device 150 or moving the controller 102 to provide a selection. The input device 150 generates an input signal upon receiving the selection or movement of the input device 150 and/or the motion sensor system 152 generates an input signal when the controller 102 moves. The input signal generated by the motion sensor 152 includes data for determining the position or orientation of the controller 102 and/or data for determining a position and an orientation of the input device 150. Examples of the data for calculating the position or orientation of the controller 102 includes an acceleration of the controller 102, an angular velocity of the controller 102, and an orientation of the controller 102. The position and orientation of the controller 102 and the position and orientation of the input device 150 are measured with reference to a reference co-ordinate system within the controller 102. Examples of the data for calculating the position and orientation of the input device 150 include an acceleration of the input device 150, an angular velocity of the input device 150, and an orientation of the input device 150. The processor 194 receives one or more of the input signals.

The processor 194 receives the one or more input signals to output input information. As an example, the input information includes the data for calculating the position or orientation or a combination thereof of the controller 102 or includes the data for calculating the position or orientation or a combination thereof of the input device 150 or the selection made by the user A via the input device 150. To illustrate, the input information includes which of a plurality of buttons of the input device 150 are selected by the user A or which of a plurality of joysticks of the input device 150 are moved and in which direction. In addition to the input information, the processor 194 also generates an instruction to send the input information to a destination address of the server system 104.

The processor 194 sends the input information via the communication channel 110 to the server system 104. For example, the processor 194 sends the input information and the instruction to the wireless communication IC 156. The wireless communication IC 156 applies the wireless communication protocol to the input information and the instruction and sends the input information and the instruction via the connection channel CC1 (FIG. 1A) to the router 118. The router 118 determines from the instruction that the input information is to be sent to the server system 104 and sends the instruction and the input information to the modem 120. The modem 120 generates one or more transfer packets from the input information and sends the transfer packets via the connection C1, the computer network 122, and the connection C2 to the server system 104.

In one embodiment, the wireless communication IC 156 and the wireless communication IC 157 are integrated into a single integrated circuit chip. In an embodiment, the wireless communication IC 156 is integrated into one integrated circuit chip and the wireless communication IC 157 is integrated into another integrated circuit chip.

Figure 1C:
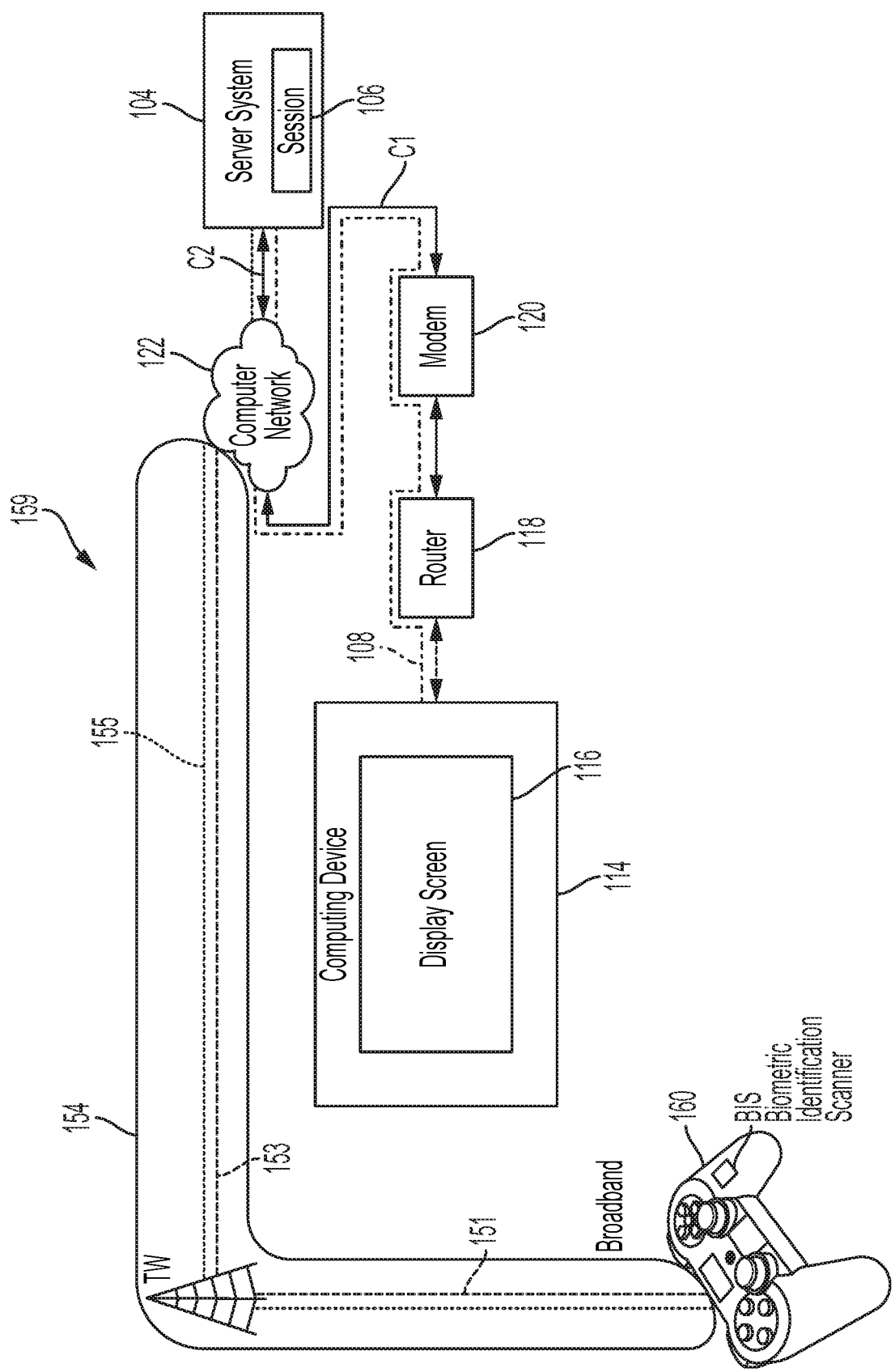
FIG. 1C is a diagram of an embodiment of a system to illustrate use of a cellular connection channel by a controller.

FIG. 1C is a diagram of an embodiment of a system 159 to illustrate use of a communication channel 155, which includes a cellular connection channel 151 and a cellular connection channel 153. The communication channel 155 is illustrated as small dashes "- - -" in FIG. 1C. Each of the cellular connection channels 151 and 152 is a wireless connection channel, such as a radio frequency connection channel. The communication channel 155 includes a cellular network 154 or a mobile network, which includes multiple cell towers, such as a tower TW. Examples of the cellular network 154 include a mobile broadband network, a fourth-generation (4G) mobile network, a 4G long term evolution (4G LTE), and a fifth-generation (5G) mobile network. The cellular network 154 transfers data using a cellular communication protocol, such as mobile broadband protocol, the 4G protocol, the 4G LTE protocol, or the 5G protocol. The system 159 includes a controller 160, which is the same in structure and function as the controller 102 (FIG. 1B), except that the controller 160 couples to the computer network 122 via the cellular network 154 instead of via the router 118. For example, the destination address of the server system 104 is stored in firmware of the controller 160 so that the controller 160 can send the identification information to the server system 104. As another example, the controller 160 is coupled to the computing device 114 via the wireless connection 115 (FIG. 1A) to send a request for the destination address of the server system 114. Upon receiving the request, the computing device 114 sends the destination address to the controller 160 via the wired connection 115.

Each of the cell towers includes a transceiver to transfer data received from the controller 160 to the computer network 122 and received from the computer network 122 to the controller 160. A combination of the cellular connection channel 151, the multiple towers, the cellular connection channel 153, the computer network 122, and the connection C2 is the communication channel 155.

The system 159 is similar, in structure and function, to the system 100 of FIG. 1A except that in the system 159 the controller 160 is used. The controller 160 is similar, in structure and function, to the controller 102 except that the controller 160 communicates with the server system 104 via the computer network 122 and one or more cell towers. Instead of communicating with the computer network 122 via the connection channel CC1, the router 118, the cable EC, the modem 120, and the connection C1, the controller 160 communicates with the computer network 122 via the cellular connection channel 151, the tower TW, and the cellular connection channel 152.

When the session 106 (FIG. 1A) of the application 1 is established or starts, the controller 160, such as a subscriber identification module (SIM) card of the controller 160, applies the cellular communication protocol to the identification information and an instruction to send the identification information to generate one or more transfer units to transfer to the server system 104. The controller 160 sends the transfer units including the identification information and the instruction via the cellular connection channel 151 to the tower TW. The computing device 114 or another device, such as the game console, is bypassed in sending the identification information. For example, the identification information is not sent from the controller 160 to the computing device 114 or the game console. As another example, the identification information is not addressed by the controller 160 to be sent to the computing device 114 or to the game console. The identification information is addressed by the controller 160 to be sent to the server system 104.

A transceiver of the tower TW receives the transfer units having the identification information and the instruction and the transceiver forwards the transfer units to the computer network 122. A gateway, such as a modem, of the computer network 122 demodulates the transfer units by applying the cellular communication protocol to extract the instruction and the identification information from the transfer units, and applies the network communication protocol to the identification information to generate transfer packets, and sends the transfer packets having the identification information to the server system 104 via the connection C2. A transfer of the input information from the controller 160 to the server system 102 via the communication channel 155 for changing the state of the virtual scene generated by execution of the application 1 is disabled or not enabled by the controller 160 until the controller 160 is paired with the session 106.

Figure 1D:
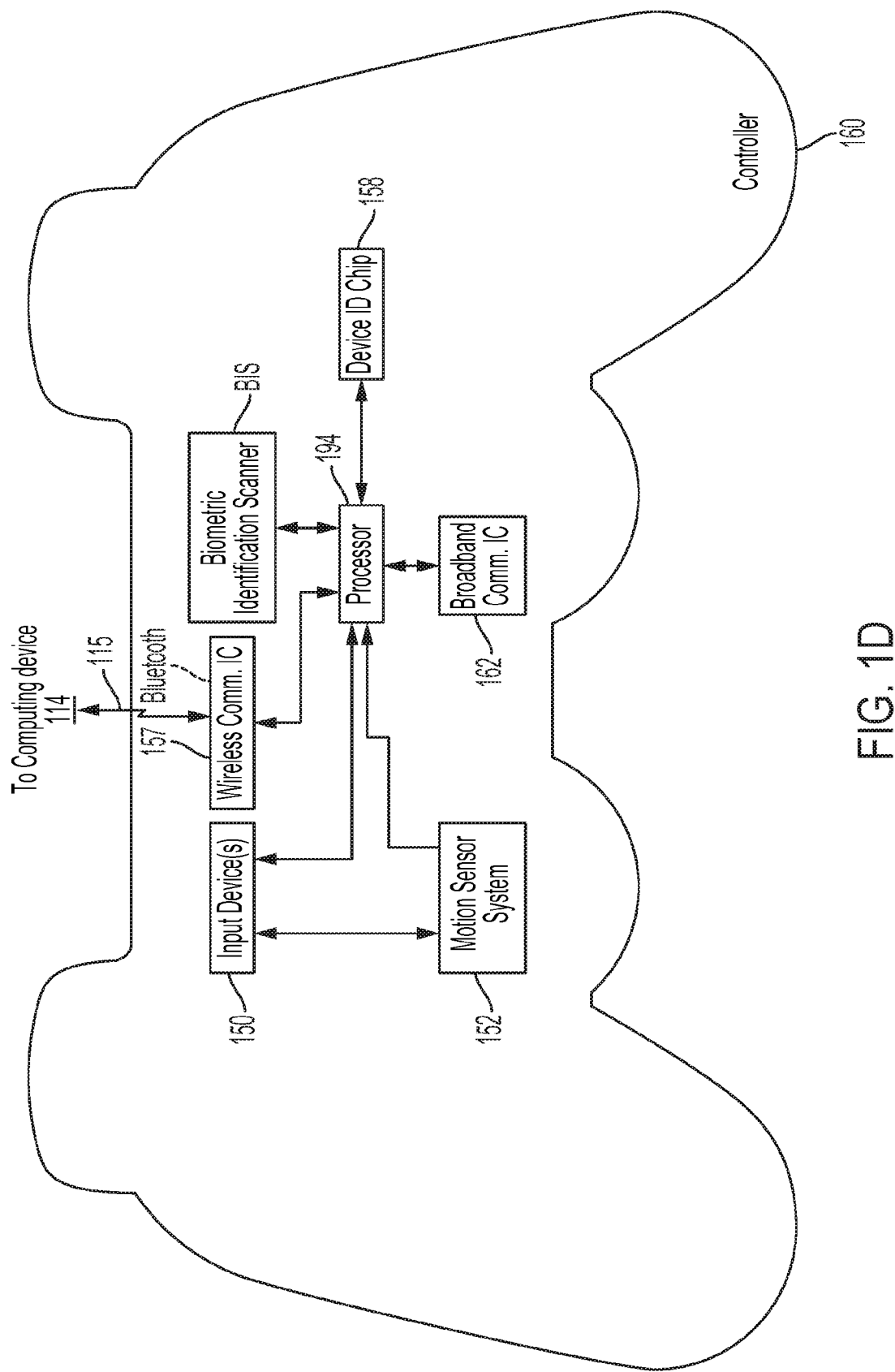
FIG. 1D is a diagram of an embodiment of the controller of the system of FIG. 1C to illustrate use of a broadband communication integrated circuit (IC) chip to transfer identification information from the controller of FIG. 1C to the server system.

FIG. 1D is a diagram of an embodiment of the controller 160 to illustrate use of a broadband communication IC 162 to transfer the identification information from the controller 160 to the server system 104 (FIG. 1C). The controller 160 includes the input device 150, the motion sensor system 152, the wireless communication IC 157, the biometric identification scanner BIS, the processor 194, the broadband communication IC 162, and the device ID chip 158. An example of the broadband communication IC 162 is the SIM card. The processor 194 is coupled to the input device 150, the motion sensor system 152, the wireless communication IC 157, the biometric identification scanner BIS, the broadband communication IC 162, and the device ID chip 158.

It should be noted that components that are common between the controller 102 of FIG. 1A and the controller 160 operate in the same manner as that described above with respect to the controller 102 except that the components operate in the manner described above with respect to the controller 160 instead of the controller 102. For example, the motion sensor system 152 measures data for calculating a position and orientation of the controller 160 instead of the controller 102.

A device ID of the controller 160 is pre-registered with the server system 104 before the session 106 (FIG. 1C) starts. For example, the device ID unique to the controller 160 is hardwired into the controller 160 and the server system 104 stores the device ID. The device ID of the controller 160 is stored in the device ID database of the server system 104.

After the session 106 is established between the computing device 114 (FIG. 1C) and the server system 104 (FIG. 1C), the user A provides his/her biometric ID to the biometric identification scanner BIS of the controller 160 to pair the controller 160 with the session 106. For example, after the session 106 starts, upon viewing the notice on the computing device 114 that the user A press his/her finger against a fingerprint reader on the controller 160 or that the user A speak into a microphone of the controller 160 or that the user 102 scan his/her eye into a biometric eye scanner of the controller 160, the user A provides his/her biometric information to the biometric information scanner BIS of the controller 160. Upon receiving the biometric ID, the biometric identification scanner BIS of the controller 160 generates a biometric identification signal and sends the biometric identification signal to the processor 194. The processor 194 receives the biometric identification signal and generates an instruction to send the biometric identification signal to the server system 104. For example, the instruction includes a destination address of the server system 104. The processor 194 sends the instruction and the biometric identification signal to the broadband communication IC 162. The broadband communication IC 162 applies the cellular communication protocol to the biometric identification signal and the instruction to generate one or more transfer units, and sends the transfer units via the cellular connection channel 151 (FIG. 1C) to the tower TW, which forwards the transfer units to the computer network 122. The computer network 122 applies the cellular communication protocol to the transfer units to extract the biometric ID and the instruction from the transfer units, further applies the network communication protocol to the biometric ID and the instruction to generate one or more transfer packets, and sends the transfer packets via the connection C2 to the server system 104.

As an alternative or in addition to sending the biometric identification signal after the session 106 starts, the processor 194 of the controller 160 accesses the device ID of the controller 160 from the device ID chip 158 and generates an instruction to send the device ID to the server system 104 to pair the controller 160 with the session 106. The processor 194 sends the instruction and the device ID to the broadband communication IC 162. The broadband communication IC 162 applies the cellular communication protocol to the device ID and the instruction to generate one or more transfer units and sends the transfer units via the cellular connection channel 151 (FIG. 1C) to the tower TW, which forwards the transfer units to the computer network 122. The computer network 122 applies the cellular communication protocol to the transfer units to extract the device ID and the instruction from the transfer units, further applies the network communication protocol to the device ID and the instruction to generate one or more transfer packets, and sends the transfer packets via the connection C2 to the server system 104.

Similarly, when the controller 160 is paired with the session 106 to establish a direct communication between the controller 160 and the server system 104, the processor 194 sends the input information via the communication channel 155 to the server system 104. For example, the processor 194 sends the input information and an instruction to send the input information to the wireless communication IC 156. The wireless communication IC 156 applies the wireless communication protocol to the input information and the instruction in order to generate one or more transfer units and sends the transfer units having the input information and the instruction via the cellular connection channel 151 to the tower TW. The tower TW determines from the instruction that the transfer units having the instruction and the input information are to be sent to the server system 104 and sends the transfer units via other cellular towers to the computer network 122. The computer network 122 applies the cellular communication protocol to the transfer units to extract the input information and the instruction from the transfer units, further applies the network communication protocol to the input information and the instruction to generate multiple transfer packets, and sends the transfer packets via the connection C2 to the server system 104.

In one embodiment, the broadband communication IC 162 and the wireless communication IC 157 are integrated into a single integrated circuit chip. In an embodiment, the broadband communication IC 162 is integrated into one integrated circuit chip and the wireless communication IC 157 is integrated into another integrated circuit chip.

In an embodiment, one controller includes both the wireless communication IC 156 of FIG. 1B and the broadband communication IC 162 in addition to remaining components illustrated in FIG. 1B or 1D. In this embodiment, the processor 194 of the controller determines whether a handover from using the connection channel 111 (FIG. 1A) to using the cellular network 154 (FIG. 1C) or vice versa is to be performed. For example, the processor 194 determines that the cellular network 154 has better quality of service (QoS) than the connection channel 111 or that there is a lower latency in transferring data via the cellular network 154 compared to the connection channel 111. To illustrate, the processor 194 determines that the cellular network 154 has a lower amount of data loss or a shorter ping time compared to an amount of loss of data sent via the connection channel 111. Upon determining that the cellular network 154 has better QoS, the processor 194 determines to use the broadband communication IC 162 instead of the wireless communication IC 156 for transferring data, described herein, such as the identification information, from the controller to the server system 104. To illustrate, when the user A uses the controller in his/her car, the cellular network 154 allow for better QoS and lower latency compared to when the user A uses the controller in his/her home. When the user A uses the controller in his/her home, the connection channel 111 allows for better QoS and lower latency compared to the cellular network 154.

It should be noted that in the embodiment, the processor 194 determines the amount of data loss by sending a pre-determined number of transfer units to provide to the server system 104 via the communication channel 155 (FIG. 1C) and requesting one or more processors, described herein, of the server system 104 for a count of the transfer units received by the server system 104. Similarly, the processor 194 determines the amount of transfer packets lost by sending a pre-determined number of transfer units to provide to the server system 104 via the communication channel 110 (FIG. 1A) and requesting one or more processors, described herein, of the server system 104 for a count of the transfer packets received by the server system 104 via the communication channel 110. The processor 194 compares the amount of transfer units lost with the amount of transfer packets lost to determine the lower amount of loss of data. Also, the processor 194 determines the latency by sending a pre-determined number of transfer units to provide to the server system 104 via the communication channel 155 and requesting one or more processors, described herein, of the server system 104 to send the transfer units back to the processor 194 via the communication channel 155. By determining an amount of time for sending and receiving the transfer units via the communication channel 155, the latency is determined. Similarly, the processor 194 determines the latency by sending a pre-determined number of transfer packets to provide to the server system 104 via the communication channel 110 and requesting one or more processors, described herein, of the server system 104 to send the transfer packets back to the processor 194 via the communication channel 110. By determining an amount of time for sending and receiving the transfer packets via the communication channel 110, the latency is determined. Both the latencies are compared by the processor 194 to determine the lower latency.

In an embodiment, one controller includes both the wireless communication IC 156 of FIG. 1B and the broadband communication IC 162 in addition to remaining components illustrated in FIG. 1B or 1D. The processor 194 of the controller determines power cost associated with using the cellular network 154 compared to using the connection channel 111. For example, the processor 194 queries a battery of the controller after a pre-determined time period for which the wireless communication IC 156 (FIG. 1B) is used and the broadband communication IC 162 (FIG. 1D) is not used. The battery is coupled to the processor 194 and provides power to all components, described herein, of the controller. Also, the processor 194 queries the battery after the same amount of the pre-determined time period for which the broadband communication IC 162 is used and the wireless communication IC 156 (FIG. 1B) is not used. The processor 194 determines whether power of the battery is used more in the pre-determined time period for which the wireless communication IC 156 is used and the broadband communication IC 162 is not used or in the pre-determined time period for which the broadband communication IC 162 is used and the wireless communication IC 156 is not used. Upon determining that the battery is used more in the pre-determined time period for which the wireless communication IC 156 is used and the broadband communication IC 162 is not used, the processor 194 determines that the power cost associated using the connection channel 111 is greater than that associated with using the cellular network 154. On the other hand, upon determining that the battery is used more in the pre-determined time period for which the broadband communication IC 162 is used and the wireless communication IC 156 is not used, the processor 194 determines that the power cost associated using the cellular network 154 is greater than that associated with using the connection channel 111. The processor 194 uses either the wireless communication IC 156 or the broadband communication IC 162 for which the power cost is lower.

In one embodiment, one controller includes both the wireless communication IC 156 of FIG. 1B and the broadband communication IC 162 in addition to remaining components illustrated in FIG. 1B or 1D. The processor 194 displays a message to the user A via a display screen of the controller or provides the message in the form of audio data to be output as sound from one or more speakers of the controller to receive a selection from the user A whether the cellular network 154 or the connection channel 111 is to be used. The user A may decide to use either the cellular network 154 or the connection channel 111 to obtain better QoS to positively impact his/her playtime. Upon receiving the selection from the user A via the input device 150 indicating that the cellular network 154 be used, the processor 194 determines to use the broadband communication IC 162 for transferring data, described herein, to the server system 104. On the other hand, upon receiving the selection from the user A via the input device 150 indicating that the connection channel 111 be used, the processor 194 determines to use the wireless communication IC 156 for transferring data, described herein, to the server system 104.

In an embodiment, the controller includes both the wireless communication IC 156 of FIG. 1B and the broadband communication IC 162 in addition to remaining components illustrated in FIG. 1B or 1D. In this embodiment, there is no handover, described above. Rather, the processor 194 determines to use both the wireless communication IC 156 and the broadband communication IC 162 to connect to the server system 104. The processor 194 sends the same data, described herein, such as the identification information, via the wireless communication IC 156 and the broadband communication IC 162 to the server system 104. The server system 104 processes the same data received first, either from the wireless communication IC 156 or the broadband communication IC 162. For example, a communication interface of the server system 104 receives one or more transfer packets having a packet ID or a timestamp from the wireless communication IC 156 and receives one or more transfer packets having the same packet ID or the same timestamp from the broadband communication IC 162 and processes the one or more transfer packets received first.

Figure 1E:
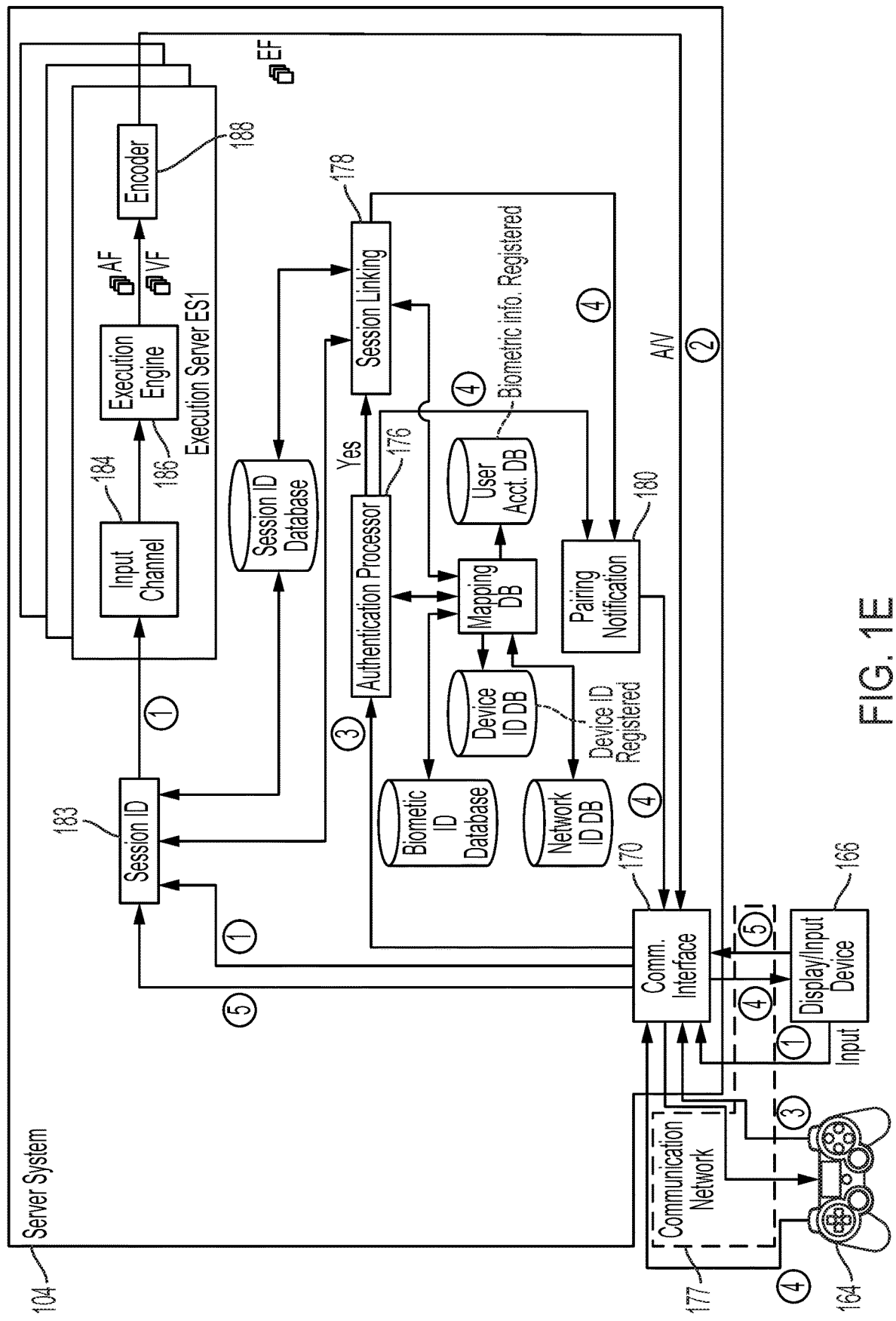
FIG. 1E is a diagram of an embodiment of the server system to illustrate pairing of the session with a controller.

FIG. 1E is a diagram of an embodiment of the server system 104 to illustrate pairing of the session 106 (FIG. 1A) with a controller 164. The controller 102 of FIG. 1A and the controller 160 of FIG. 1C are examples of the controller 164. The server system 104 includes an authentication processor 176, a session linking processor 178, the device ID database, the network ID database, a user account database, the mapping database, a session ID database, the biometric ID database, a pairing notification processor 180, a communication interface 170, a session ID processor 183, and an execution server ES1.

The communication interface 170 is coupled to the session ID processor 183, the pairing notification processor 180, the authentication processor 176 and the execution server ES1. The pairing notification processor 180 is coupled to the authentication processor 176 and the session linking processor 178. The authentication processor 176 is coupled to the session linking processor 178 and to the mapping database, which is stored in one or more memory devices of the server system 104. The mapping database is coupled to the device ID database, the user account database, the biometric ID database, and the network ID database. The session linking processor 178 is coupled to the session ID database. The session ID processor 183 is coupled to the execution server ES1, the session ID database, and to the session linking processor 178.

The server system 104 is coupled via a communication network 177 to the controller 164. Examples of the communication network 177 include the communication channel 110 of FIG. 1A and the communication channel 155 of FIG. 1C. Additional examples of the communication network 177 include the communication channel 108 of FIGS. 1A and 1C. To illustrate, the communication network 177 includes the communication channels 110 and 108 or the communication channels 155 and 108.

The server system 104 is coupled to a display device 166, such as an LED display device, an LCD display device, or a plasma display device. The display device 166 can be an input device, such as a touchscreen display, that receives a selection from an administrative user. An example of the display device 166 is the computing device 114 of FIGS. 1A and 1C.

The execution server ES1 has an input channel 184, such as a computer port, which is coupled via the session ID processor 183 to the communication interface 170 for receiving data from the communication interface 170. The execution server ES1 further has an execution engine 186 that executes the application 1, such as a video conferencing application or a game, examples of which include a video game, a virtual reality game, and an augmented reality game.

Examples of an engine, as described herein, include a processor and a computer software module. An application is executed, for example, to change the state of the virtual scene displayed on the computing device 114 or on another display screen, described herein. Examples of the state of the virtual scene include a position of a virtual object in the virtual scene to be displayed on the client, an orientation of the virtual object, a color of the object, a shade of the virtual object, a texture of the virtual object, a position of a background in the virtual scene, an orientation of the background, a color of the background, a shade of the background, a texture of the background, or a combination of two or more thereof. One or more video frames, or one or more audio frames, or a combination thereof, are generated by the execution engine ES1 and the one or more frames include the state or a change to the state. The one or more frames that are generated are sometimes referred to herein as a video output. Examples of the video frames include I-frames, P-frames, and B-frames.

The communication interface 170 can be a network interface, such as a network interface controller or a network interface card, that applies the network communication protocol to transfer packets that are received via the communication network 177 from the controller 164 to extract data from the transfer packets, and applies the network communication protocol to data to generate one or more transfer packets that are to be transferred via the communication network 177 to the controller 164. An example of the communication interface 170 includes a processor that is coupled to the network interface.

Examples of the encoder 188 include a processor or a computer software module that performs compression of frames. For example, the encoder 188 receives frames from the execution engine 186 and performs intraframe or interframe compression by applying a compression protocol, such as H.264 or another frame compression standard.

In an operation 1, the display device 166 sends one or more transfer packets having the login information via the communication network 177 to the communication interface 170. The communication interface 170 applies the network communication protocol to the transfer packets to extract the login information from the transfer packets. A processor of the communication interface 170 identifies information extracted from the transfer packs as being the login information and upon identifying so, provides the login information to the session ID processor 183. For example, the processor of the communication interface 170 determines that a structure, such as a series of alphanumeric characters or a structure of a username or a structure of a password, of the information received from the transfer packets matches that of the login information and determines that the information is login information.

The session ID processor 183 determines whether the login information is authentic and establishes the session 106 of execution of the application 1 upon determining that the login information is authentic. Also, the session ID processor 183 allows access to the user account 1 upon determining that the login information is authentic. An example of the session 1 is a temporary and interactive interchange or communication of data or information between the display device 166 and the server system 102. The session 106 ends when the user A logs out of the user account 1 or there is a loss of connection between the server system 102 and the display device 166. The loss of connection between the server system 102 and the display device 166 can be due to a malfunction of the communication channel 110 of FIG. 1A or the communication channel 155 of FIG. 1C. On the other hand, the session ID processor 183 does not establish the session 106 upon determining that the login information is not authentic.

The session ID processor 183 assigns a session ID1, such as an alphanumeric number, to the session 106, links the session ID with the user account 1 assigned to the user A, and stores the session ID1 in the session ID database. The session ID1 is linked to the user account 1 by establishing a one-to-one relationship between the session ID1 and the user account 1 for the session and the link is stored by the session ID processor 183 in the mapping database.

The input channel 184 receives a determination from the session ID processor 183 that the login information is authentic and provides the determination to the game execution engine 186. Upon receiving the determination that the login information is authentic, the game execution engine 186 generates one or more frames, such as audio frames, or video frames, or a combination thereof, of the information associated with the session 106. To illustrate, the game execution engine 186 generates the frames that include a name of the application 1 or a title of the application 1 or a virtual image of the application 1. The frames are encoded by the encoder 188 and sent to the communication interface 170 in an operation 2 to output encoded frames. The communication interface 170 applies the network communication protocol to the encoded frames to generate a stream having one or more transfer packets and sends the stream via the communication network 177 to the display device 166. Examples of the stream sent from the communication interface 170 include a video stream or an audio stream or a combination thereof.

After receiving the information associated with the session, in an operation 3, the controller 164 sends the identification information, such as a biometric ID1 or a device ID1 or a network ID1 or a combination of two or more thereof, via the communication network 177 to the communication interface 170 to pair the controller 164 with the session 106. The communication interface 170 applies the network communication protocol to one or more transfer packets that include the identification information to extract the identification information from the transfer packets, sends the identification information to the authentication processor 176.

The processor of the communication interface 170 identifies information extracted from the transfer packets as being the identification information and upon identifying so, provides the identification information to the authentication processor 176. For example, the processor of the communication interface 170 determines that a structure, such as a series of phonemes or a fingerprint or an IP address or a device ID, of the information received from the transfer packets matching that of the identification information and determines that the information is the identification information.

Upon receiving the biometric ID1 from the communication interface 170, the authentication processor 176 retrieves a pre-registered biometric ID1 from the biometric ID database and processes the received biometric ID1 to determine whether the received biometric ID1 is authentic. For example, the authentication processor 176 determines whether there is a match between the received biometric ID1 and the pre-registered biometric ID1. The pre-registered biometric ID1 is pre-registered with the user account 1 assigned to the user A by being stored in the biometric ID database and is linked to the user account 1. Upon determining that the match occurs, the authentication processor 176 determines that the received biometric ID1 is authentic to verify the received biometric ID1. On the other hand, upon determining that the match does not occur, the authentication processor 176 determines that the received biometric ID1 not authentic. In the same manner, upon receiving the device ID1 from the communication interface 170, the authentication processor 176 retrieves a pre-registered device ID1 from the device ID database and processes the received device ID1 to determine whether the received device ID1 is authentic. Moreover, in the same manner, upon receiving the network ID1 from the communication interface 170, the authentication processor 176 retrieves a pre-registered network ID1 from the network ID database and processes the received network ID1 to determine whether the received network ID1 is authentic.

It should be noted that the mapping database pre-stores an association, such as a one-to-one correspondence or a link or a mapping, between the pre-registered biometric ID1 and the user account 1. For example, before the biometric ID1 is received from the controller 164 to pair the controller 164 with the session 106, the session ID processor 183 receives the pre-registered biometric ID1 from the computing device 114 via the communication channel 108 of FIG. 1A or 1C, and stores the pre-registered biometric ID1 in the biometric ID database. In addition, the session ID processor 183 establishes the association between the pre-registered biometric ID1 and the user account 1, stores the association within the mapping database, and stores the pre-registered biometric ID1 within the biometric ID database. In a similar manner, before the network ID1 and the device ID1 are received from the controller 164 to pair the controller 164 with the session 106, the session ID processor 183 stores an association between the pre-registered device ID1 and/or the user account 1 within the mapping database and an association between the pre-registered network ID1 and the user account 1 within the mapping database, stores the pre-registered network ID1 within the network ID database, and stores the pre-registered device ID1 within the device ID database. The user account 1 and the other user accounts 2 through N are stored within the user account database.

The authentication processor 176 provides the determination that the received biometric ID1 is authentic to the session linking processor 178. The session linking processor 178 establishes an association between the session ID1 and the received biometric ID1 and stores the association within the mapping database to pair the session 116 with the controller 164. For example, the session linking processor 178 generates a one-to-one link or a mapping or a correspondence between the session ID1 of the session 106 and the received biometric ID1. In the same manner, the session linking processor 178 establishes an association between the session ID1 and the received device ID1 and stores the association within the mapping database. As an example, the session linking processor 178 generates a one-to-one link or a mapping or a correspondence between the session ID1 of the session 106 and the received device ID1. Also, in the same manner, the session linking processor 178 establishes an association between the session ID1 and the received network ID1 and stores the association within the mapping database. For example, the session linking processor 178 generates a one-to-one link or a mapping or a correspondence between the session ID1 of the session 106 and the received network ID1.

Upon establishing the association between the identification information that is received from the controller 164 and the session 106, in an operation 4, the session linking processor 178 provides a determination of the association to the pairing notification processor 180. In response to receiving the determination of the association, the pair notification processor 180 generates the pairing notification and sends the pairing notification to the communication interface 170. The pairing notification processor 180 also generates an instruction to send the pairing notification to the display device 166 or an instruction to send the pairing notification to the controller 164 or to both the display device 166 and the controller 164. The communication interface 170 receives the instruction from the pairing notification processor 180, applies the network communication protocol to the pairing notification and to a destination address of the display device 166 or to a destination address of the controller 164 or to both the destination addresses to generate one or more transfer packets, and sends the transfer packets via the communication network 177 to the display device 166 or to the controller 164 or to both the controller 164 and the display device 166.

When the authentication processor 176 determines that the received biometric ID1 or the received device ID1 or the received network ID1 or a combination of two or more thereof is not authentic, the authentication processor 176 informs the pairing notification processor 180 of the determination. Upon receiving the determination, the pairing notification processor 180 generates a not-paired notification and an instruction to send the not-paired notification to the display device 166 or the controller 164 or both the controller 164 and the display device 166. Upon receiving the instruction and the not-paired notification, the communication interface 170 applies the network communication protocol to a destination address of the display device 166 or a destination address of the controller 164 or both the destination addresses and to the not-paired notification to generate one or more transfer packets and sends the transfer packets via the communication network 177 to the display device 166 or to the controller 164 or to both the controller 164 and the display device 166.

The communication interface 170 sends the transfer packets including a pairing-related notification, such as the not-paired notification or the pairing notification, via the connection C2 (FIG. 1A), the computer network 122 (FIG. 1A), the connection C1 (FIG. 1A), the modem 120 (FIG. 1A), the cable EC (FIG. 1A), the router 108 (FIG. 1A), and the connection channel CC2 (FIG. 1A) to the display device 166. The modem 120 of FIGS. 1A and 1C receives the transfer packets including the pairing-related notification and the destination address of the display device 166. The modem 120 applies the network communication protocol to the transfer packets to extract the destination address of the display device 166 and the pairing-related notification, and sends the pairing-related notification and the destination address to the router 118 of FIGS. 1A and 1C. The router 118 determines from the destination address of the display device 166 that the pairing-related notification is to be sent to the display device 166, and sends the pairing-related notification to the display device 166. For example, the router 118 identifies from an IP address of the display device 166 that the pairing-related notification is to be sent to the display device 166. Upon receiving the pairing-related notification, a GPU of the display device 166 displays the pairing-related notification on a display screen of the display device 166. In case the pairing-related notification is audio data, an audio processor of the display device 166 outputs the pairing-related notification as sound. Similarly, when the pairing-related notification includes both image and audio data, both the GPU and the audio processor of the display device 166 synchronize with each other to output the pairing-related notification as images and sound.

In one embodiment, the communication interface 170 sends the transfer packets including the pairing-related notification via the connection C2, the computer network 122, the connection C1, the modem 120, the cable EC, the router 108, and the connection channel CC1 to the controller 102 of FIG. 1A. The modem 120 of FIGS. 1A and 1C receives the transfer packets including the pairing-related notification and the destination address of the display device 166. The modem 120 applies the network communication protocol to the transfer packets to extract the destination address of the controller 102 and the pairing-related notification, and sends the pairing-related notification and the destination address to the router 118 of FIGS. 1A and 1C. The router 118 determines from the destination address of the controller 102 that the pairing-related notification is to be sent to the controller 102, and sends the pairing-related notification to the controller 102 via the connection channel CC1. For example, the router 118 identifies from an IP address of the controller 102 that the pairing-related notification is to be sent to the controller 102. Upon receiving the pairing-related notification, a GPU of the controller 102 displays the pairing-related notification on a display screen of a display device of the controller 102. In case the pairing-related notification is audio data, an audio processor of the display device of the controller 102 outputs the pairing-related notification as sound. Similarly, when the pairing-related notification includes both image and audio data, both the GPU and the audio processor of the controller 102 synchronize with each other to output the pairing-related notification as images and sound.

In an embodiment, the communication interface 170 sends the transfer packets including the pairing-related notification via the connection C2, the computer network 122, the connection C1, and the cellular network 154 (FIG. 1C) to the controller 160 of FIG. 1C. The computer network 122 of FIG. 1C receives the transfer packets including the pairing-related notification and the destination address of the controller 160. The computer network 122 applies the network communication protocol to the transfer packets to extract the destination address of the controller 160 and the pairing-related notification, further applies the cellular communication protocol to the destination address and the pairing-related notification to generate one or more transfer units, and sends the transfer units to the tower TW of the cellular network 154 via the cellular connection channel 153. The tower TW forwards the transfer units to the controller 160 of FIG. 1C via the cellular connection channel 151 to the controller 160 according to the destination address of the controller 160. The controller 160 applies the cellular communication protocol to obtain the pairing-related notification. Upon receiving the pairing-related notification, a GPU of the controller 160 displays the pairing-related notification on a display screen of a display device of the controller 160. In case the pairing-related notification is audio data, an audio processor of the display device of the controller 160 outputs the pairing-related notification as sound. Similarly, when the pairing-related notification includes both image and audio data, both the GPU and the audio processor of the controller 160 synchronize with each other to output the pairing-related notification as images and sound.

In an operation 5, when the controller 164 is paired, such as linked, with the session 106, the controller 164 can be used by the user A to generate one or more transfer packets having the input information and the session ID1 to change the state of the virtual scene. For example, a selection of a button on the controller 164 by the user A enables a virtual weapon to fire or a virtual user to jump in a video game. As another example, a selection of a joystick on the controller 164 by the user A enables a change a number of areas on a display screen on the display device 166 in which live streams showing images of different users are displayed. To illustrate, instead of two live streams showing two users from two different locations on the display screen of the display device 166, a live stream of one of the two users is received by the display device 166 for display on the display screen.

The communication interface 170 receives the transfer packets that include the input information and the session ID1 from the controller 164 via the communication network 177 and applies the network communication protocol to the transfer packets to extract the input information and the session ID1. The processor of the communication interface 170 determines that information within the transfer packets have a structure, such as a series of button presses or a series of joystick movements, that matches a structure of the input information and upon determining so, sends the input information to the session ID processor 183. The session ID processor 183 provides the input information via the input channel 184 to the execution engine 186. The session ID processor 183 can authenticate the session ID1 before sending the input information to the execution engine 186.

The execution engine 186 is interacted with by the controller 164 to determine to change the state of the virtual scene according to the input information and generates multiple frames, such as audio frames or video frames or a combination thereof, having the state of the virtual scene. For example, the execution engine 186 determines to change a position, or in orientation, or an intensity, or a color, or a shape, or a combination therefore of the virtual object based on the input information to generate the frames. Examples of the frames includes I frames, P frames, and B frames. The execution engine 186 provides the frames to the encoder 188, which compresses the frames to output the encoded frames. For example, the frames are compressed using the H.264 standard. In addition, the execution engine 186 generates an instruction to send the frames to the display device 166.

The encoder 180 provides the encoded frames to the communication interface 170. The communication interface 170 applies the network communication protocol to the encoded frames and the instruction to generate one or more transfer packets and sends the transfer packets via the connection C2 of FIGS. 1A and 1C, the computer network 122, and the connection C1 of FIGS. 1A and 1C to the modem 120 of FIGS. 1A and 1C. The modem 120 applies the network communication protocol to the transfer packets to extract the instruction and the encoded frames from the transfer packets and sends the instruction and the encoded frames to the router 118 of FIGS. 1A and 1C via the Ethernet connection EC. The router 118 determines from the destination address within the instruction that the encoded frames are to be sent to the display device 166, and sends the encoded frames to the display device 166 via the connection channel CC2 of FIGS. 1A and 1C. The display device 166 decodes the encoded frames to output frames to further display images of the virtual scene, having the virtual object and the virtual background, on the display screen of the display device 166 or output audio data via speakers of the display device 166 or a combination thereof. For example, the display device 166 displays the virtual object that has changed its position or its orientation or its color or its intensity or its texture. As another example, the display device 166 outputs a sound made by the virtual object. When the display device 166 displays the images or outputs a sound associated with the images according to the encoded frames received from the server system 104 in response to the input information received from the controller 164, the server system 104 or the application 1 and the controller 164 interact with each other.

It should be noted that in an embodiment, instead of each processor of the server system 104, a software module, such as a part of a computer software program, is used and the software modules are executed by one or more processors of the server system 104. Each software module can contain one or several routines. In one embodiment, functions of some processors of the server system 104 are executed as modules and the remaining processors of the server system 104 are hardware components, such as integrated circuits.

In an embodiment, functions, described herein, as being performed by the authentication processor 176, the session ID processor 183, the processor of the communication interface 170, the pairing notification processor 180, the encoder 188, and the execution engine 186, are instead performed by another other number of processors or servers of the server system 104.

In one embodiment, the user A decides whether to pair the controller 164 with the session 164. Instead of sending the determination that the biometric ID1 or the received device ID1 or received network ID1 or a combination of two or more thereof is authentic to the session linking processor 178, the authentication processor 176 sends the determination regarding the authentication to the pairing notification server 180. Upon receiving the determination from the authentication processor 176, the pairing notification processor 180 generates a pairing-request notification and an instruction to send the pairing-request notification to the display device 166. The pairing-request notification includes a request to pair the controller 164 with the session 106. The pairing notification processor 180 sends the pairing-request notification and the instruction to the communication interface 170.

In this embodiment, upon receiving the instruction and the pairing-request notification, the communication interface 170 applies the network communication protocol to a destination address of the display device 166 and to the pairing-request notification to generate one or more transfer packets and sends the transfer packets via the communication channel 108 of FIGS. 1A and 1C to the display device 166.

Continuing with the embodiment, the communication interface 170 sends the transfer packets via the connection C2, the computer network 122, the connection C1, the modem 120, the cable EC, the router 108, and the connection channel CC2 to the display device 166. The modem 120 of FIGS. 1A and 1C receives transfer packets including the pairing-request notification and a destination address of the display device 166. The modem 120 applies the network communication protocol to the transfer packets to extract the destination address of the display device 166 and the pairing-request notification, and sends the pairing-request notification and the destination address to the router 118 of FIGS. 1A and 1C. The router 118 determines from the destination address of the display device 166 that the pairing-request notification is to be sent to the display device 166, and sends the pairing-request notification to the display device 166. For example, the router 118 identifies from an IP address of the display device 166 that the pairing-request notification is to be sent to the display device 166. Upon receiving the pairing-request notification, the GPU of the display device 166 displays the pairing-request notification on a display screen of the display device 166. In case the pairing-request notification is audio data, the audio processor of the display device 166 outputs the pairing-request notification as sound. Similarly, when the pairing-request notification includes both image and audio data, both the GPU and the audio processor of the display device 166 synchronize with each other to output the pairing-request notification as images and sound.

Moreover, in the embodiment, upon listening or viewing or both viewing and listening to the pairing-request notification, the user A makes a selection on the controller 164 to indicate whether to pair the controller 164 with the session 106. For example, the user A selects a first button on the controller 164 to provide a positive response to indicate that the user A wishes to pair with the session 106. The user A selects a second button on the controller 164 to provide a negative response to indicate that the user A does not wish to pair with the session 106.

In the embodiment, the controller 164 generates input data indicating the selection made by the user A regarding the pairing. The wireless communication IC 157 (FIG. 1B or 1D) of the controller 164 sends the input data via the wireless connection 115 between the controller 164 and the display device 166 to the display device 166. The GPU of the display device 166 receives the input data and displays the positive or the negative response on the display device 166.

In the embodiment, the controller 164 also sends the input data via the communication channel 110 of FIG. 1A or the communication channel 155 of FIG. 1C to the server system 104. For example, the input data is sent from the controller 164 via the connection channel CC1 of FIG. 1A to the router 108 of FIG. 1A, which routes the input data via the cable EC to the modem 120 of FIG. 1A. The modem 120 generates one or more transfer packets by applying the network communication protocol to the input data and sends the transfer packets via the connection C1 of FIG. 1A, the computer network 122 of FIG. 1A, and the connection C2 of FIG. 1A to the server system 104.

Furthermore, in the embodiment, the communication interface 170 receives the transfer packets having the input data and applies the network communication protocol to extract the input data from the transfer packets. The processor of the communication interface 170 identifies information within the transfer packets as having a structure of the input data, and upon identifying so, sends the input data to the session linking processor 178. The session linking processor 178 determines whether the response within the input signal is positive or negative. In response to receiving the input data having the positive response, the session linking processor 178 pairs the controller 164 with the session 106. On the other hand, in response to receiving the input data having the negative response, the session linking processor 178 does not pair the controller 164 with the session 106. In this manner, the user A makes a decision whether to pair the controller 164 with the session 106.

In one embodiment, the controller 164 includes components of both the controllers 102 and 160. For example, the processor 194 is coupled to both the broadband communication IC 162 of FIG. 1D and the wireless communication IC 156 of FIG. 1B. In this example, the processor 194 of the controller 164 sends the input data via the wireless communication IC 156 and the communication channel 110 of FIG. 1A and via the broadband communication IC 162 and the communication channel 155 of FIG. 1C to the server system 104. In an embodiment, the pairing-request notification is sent from the server system 104 to the controller 164 via the communication network 177 for display on a display screen of the controller 164 or for output via one or more speakers of the controller 164.

It should be noted that in one embodiment, the identification information is different from the login information. For example, the login information is a series of alphanumeric characters, such as a username or a password, that are provided or entered by the user A via an input device of a controller to the server system 104. The identification information is not the series of alphanumeric characters that are provided or entered by the user A via the input device of the controller to the server system 104.

In an embodiment, until the controller 102 is paired with the server system 104, the user A cannot use the controller 102 to change the state of the virtual scene. For example, the user A uses the controller 102 by selecting or moving the input device 150 to provide a selection to further generate the input information to change the state of the virtual scene and one or more transfer packets having the input information are generated and sent via the communication network 177 to the communication interface 170. The communication interface 170 applies the network communication protocol to extract the input information for changing the state of the virtual scene and provides the input information to the session ID processor 183. The processor of the communication interface 170 determines that information within the transfer packets have a structure, such as a series of button presses or a series of joystick movements, that matches a structure of the input information for changing the state of the virtual scene and upon determining so, sends the input information to the session ID processor 183.

In this embodiment, upon receiving the input information, the session ID processor 183 sends a request to the session linking processor 178 to determine whether the controller 164 from which the input information is received is paired with the session 106. Upon receiving a determination from the session linking processor 178 that the controller 164 is not paired with the session 106, the session ID processor 183 does not provide the input information via the input channel 184 to the execution engine 186 and the execution engine 186 cannot process the input information to change the state of the virtual scene.

In an embodiment, one controller includes both the wireless communication IC 156 of FIG. 1B and the broadband communication IC 162 in addition to remaining components illustrated in FIG. 1B or 1D. In this embodiment, the communication interface 170 determines whether a handover from using the connection channel 111 (FIG. 1B) to using the cellular network 154 (FIG. 1C) or vice versa is to be performed. For example, the processor of the communication interface 170 determines that the cellular network 154 has better QoS than the connection channel 111 or that there is a lower latency in transferring data via the cellular network 154 compared to the connection channel 111. To illustrate, the processor of the communication interface 170 determines that the cellular network 154 has a lower amount of packet loss or a shorter ping time compared to the connection channel 111. Upon determining that the cellular network 154 has better QoS, the processor of the communication interface 170 determines to use the broadband communication IC 162 instead of the wireless communication IC 156 for transferring data, described herein, such as the pairing information or a pairing-request notification, from the server system 104 to the controller.

In one embodiment, the controller includes both the wireless communication IC 156 of FIG. 1B and the broadband communication IC 162 in addition to remaining components illustrated in FIG. 1B or 1D. In this embodiment, there is no handover, described above. Rather, the processor of the communication interface 170 determines to use both the wireless communication IC 156 and the broadband communication IC 162 to connect to the controller. The processor of the communication interface 170 sends the same data, described herein, such as the pairing information or a pairing-request notification, via the wireless communication IC 156 and the broadband communication IC 162 to the controller. The processor 194 processes the data received first, either by the wireless communication IC 156 or the broadband communication IC 162, from the server system 104. For example, the wireless communication IC 156 receives one or more transfer packets having a packet ID or a timestamp from the server system 104 and the broadband communication IC 162 receives one or more transfer units having the same packet ID or the same timestamp from the server system 104. When the wireless communication IC 156 receives the one or more transfer packets first compared to the reception of the transfer units by the broadband communication IC 162, the wireless communication IC 156 extracts information from the one or more transfer packets and sends the information to the processor 194 for processing.

In an embodiment, the computing device 114 (FIG. 1A) can be activated from a sleep mode when a selection of one or more of the input devices 150 (FIG. 1B) is made by the user A on the controller 164. The server system 104 wakes up the computing device 114 when the user A turns selects a PS™ button the controller 164 or selects the fingerprint pad on the controller 164. In the sleep mode, the computing device 114 operates in a low power state in which it still can receive messages from the server system 104.

Figures 1, 1F, 2:
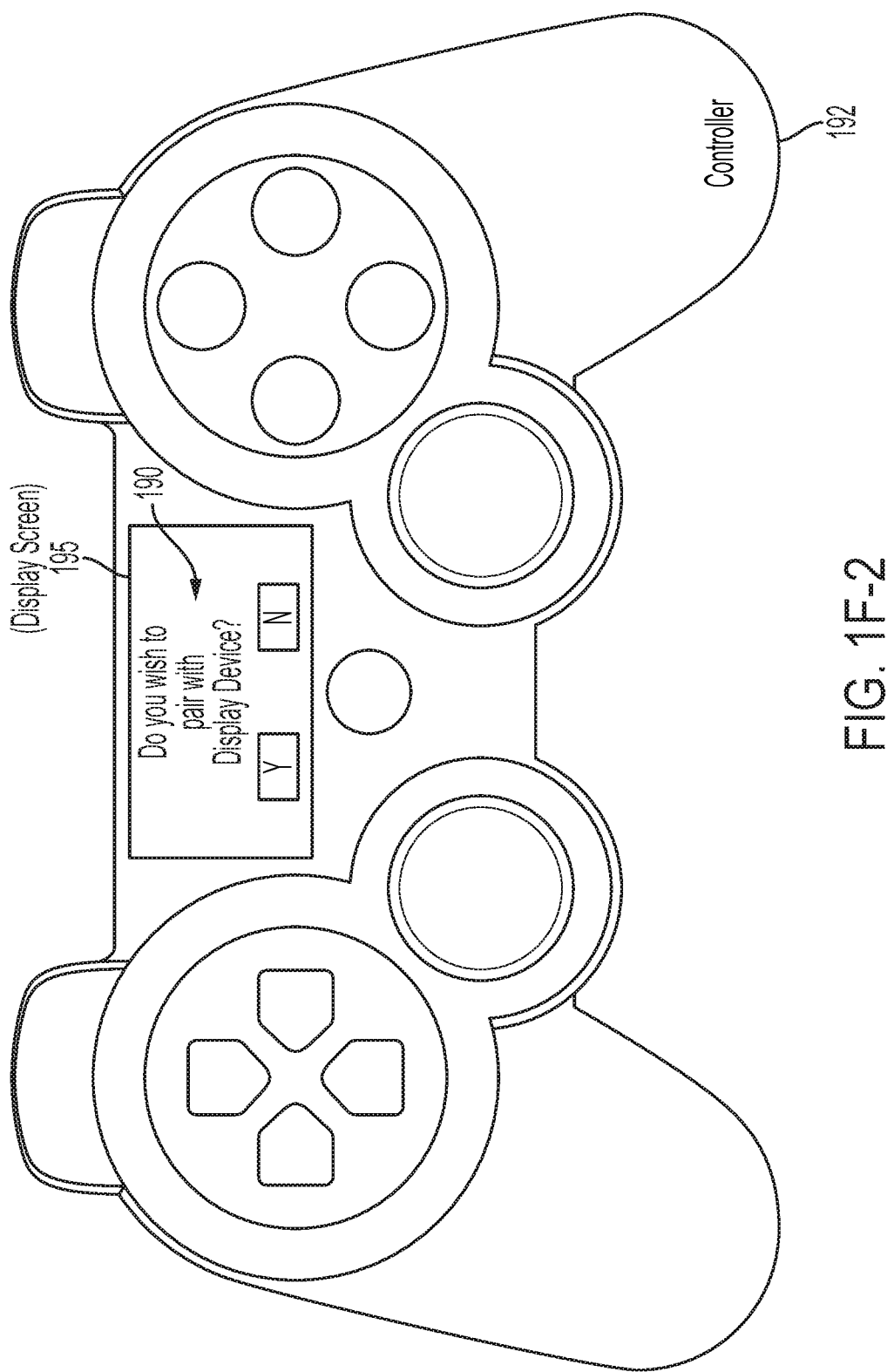

FIG. 1F-1 is a diagram of an embodiment of a pairing-request notification 190 that is displayed on the display screen 116 of the computing device 114. The pairing-request notification 190 is an example of the pairing-request notification that is generated by the pairing notification processor 180 of FIG. 1E. The pairing-request notification 190 includes that the biometric information of the user A is authenticated. Moreover, the pairing-request notification 190 includes a question regarding whether the user A wishes to pair with the controller 164 of FIG. 1E. The user A selects one or more buttons and one or more joysticks on the controller 164 to indicate whether the user A wishes to pair the session 106 and the controller 164. The controller 164 generates the input data indicating the selection made by the user A and.

FIG. 1F-2 is a diagram of an embodiment of a controller 192 to illustrate a display of the pairing-request notification 190 on a display screen 195 of the controller 192. Examples of a display screen, as described herein, include a liquid crystal display screen or a light emitting diode screen or a plasma display screen. The controller 192 is an example of the controller 102 of FIG. 1A, of the controller 160 of FIG. 1C, and of the controller 164 of FIG. 1E. The controller 192 has the display screen 195 on which the pairing-request notification 190 is displayed. The controller 192 includes a GPU that is coupled to the processor 194 of FIGS. 1B and 1D and the GPU is coupled to the display screen 195.

The pairing notification processor 180 of FIG. 1E generates the pairing-request notification 190 and an instruction to send the pairing-request notification 190 to the controller 192. The pairing notification processor 180 sends the pairing-request notification and the instruction to the communication interface 170 of FIG. 1E.

Upon receiving the instruction and the pairing-request notification 190, the communication interface 170 applies the network communication protocol to a destination address of the controller 192 and to the pairing-request notification 190 to generate one or more transfer packets and sends the transfer packets via the communication channel 110 of FIG. 1A to the controller 192. With reference to FIG. 1A, the communication interface 170 sends the transfer packets via the connection C2, the computer network 122, the connection C1, the modem 120, the cable EC, the router 108, and the connection channel CC1 to the controller 192. The modem 120 receives the transfer packets including the pairing-request notification 190 and a destination address of the controller 192. The modem 120 applies the network communication protocol to the transfer packets to extract the destination address of the controller 192 and the pairing-request notification 190, and sends the pairing-request notification 190 and the destination address to the router 118. The router 118 determines from the destination address of the controller 192 that the pairing-request notification 190 is to be sent to the controller 192, and sends the pairing-request notification to the controller 192 via the connection channel CC1. For example, the router 118 identifies from an IP address of the controller 192 that the pairing-request notification 190 is to be sent to the controller 192. Upon receiving the pairing-request notification 190, the GPU of the controller 192 displays the pairing-request notification 190 on the display screen 195. In case the pairing-request notification is audio data, an audio processor and one or more speakers of the controller 192 outputs the pairing-request notification as sound. Similarly, when the pairing-request notification includes both image and audio data, both the GPU and the audio processor of the controller 192 synchronize with each other to output the pairing-request notification as images and sound.

In one embodiment in which the cellular communication protocol of FIG. 1C is used, upon receiving the pairing-request notification 190 and the instruction to send the pairing-request notification 190 to the controller 160 from the pairing notification processor 180 of the server system 104, the communication interface 170 applies the network communication protocol to a destination address of the controller 160 and to the pairing-request notification 190 to generate one or more transfer packets and sends the transfer packets via the communication channel 155 of FIG. 1C to the controller 160. With reference to FIG. 1C, the communication interface 170 sends the transfer packets via the connection C2, the computer network 122, the cellular connection channel 153, the tower TW, and the cellular connection channel 151 to the controller 160. The gateway of the computer network 122 applies the network communication protocol to extract the destination address and the pairing-request notification 190 from the transfer packets, and applies the cellular communication protocol to the destination address and pairing-request notification 190 to generate one or more transfer units, and sends the transfer units via the cellular communication channel 155 to the tower TW. The transceiver of the cell tower TW forwards the transfer units to the controller 160 via the cellular communication channel 151 according the destination address of the controller 160. The broadband communication IC 162 (FIG. 1D) of the controller 160 applies the cellular communication protocol to the transfer units to extract pairing-request notification 190 and provides the pairing-request notification 190 to the GPU of the controller 160 for display of the pairing-request notification 190 on the display screen of the controller 160. In case the pairing-request notification 190 is to be output as sound, the broadband communication IC 162 provides the pairing-request notification 190 to the audio processor of the controller 160 to output the pairing-request notification 190 as sound. In case the pairing-request notification 190 includes both image and audio data, the broadband communication IC 162 provides the image data of the pairing-request notification 190 to the GPU of the controller 160 and the audio data of the pairing-request notification 190 to the audio processor of the controller 160 to synchronize output of the audio data as sound with a display of the video data.

Figure 1G:
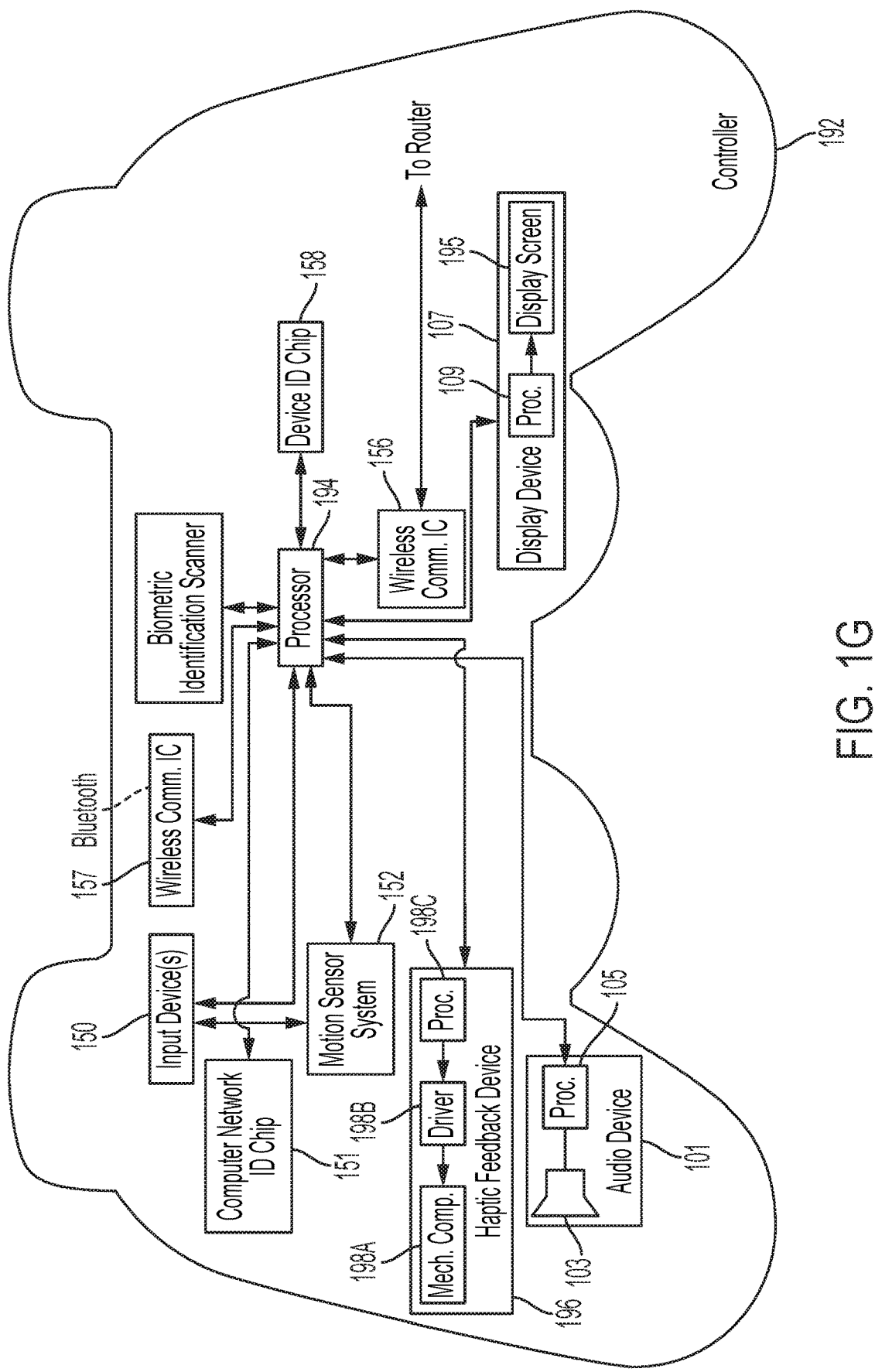
FIG. 1G is a diagram of an embodiment of a controller to illustrate a haptic feedback device, an audio device, and a display device of the controller.

FIG. 1G is a diagram of an embodiment of the controller 192 to illustrate a haptic feedback device 196, an audio device 101, and a display device 107 of the controller 192. The controller 192 has the components of the controller 102 of FIG. 1B and has additional components, such as the haptic feedback device 196, the audio device 101, and the display device 107.

The display device 107, the haptic feedback device 196, and the audio device 101 are coupled to the processor 194. The display device 107 includes a processor 109, such as a GPU, and the display screen 195. The display screen 195 is coupled to the processor 109.

The audio device 101 includes an audio processor 105 and a speaker 103. The speaker 103 is coupled to the audio processor 105. The haptic feedback device 196 includes a processor 198C, a driver 198B, and a mechanical component 198A. The processor 198C is coupled to the driver 198B, which is coupled to the mechanical component 198A. An example of a driver includes one or more transistors that are coupled to each other. An example of the mechanical component 198A includes a tactile sensor, such as a motor or a transducer.

The processor 194 receives a notification, such as the pairing-related notification or the pairing-request notification 190, from the wireless communication IC 156 and provides the notification to the processor 109. The processor 109 applies a rendering operation to the notification to display the video data on the display screen 195.

Moreover, the processor 194 receives audio data of the notification, such as the pairing-related notification or the pairing-request notification 190, from the wireless communication IC 156 and provides the audio data to the audio processor 105. The audio data of the notification has the same information that is included within one or more images of the notification or has additional information that is to be output as sound with the images of the notification. The audio processor 105 processes, such as filters or amplifies or converts from a digital to an analog form, the audio data and provides the processed audio data to the speaker 103. The speaker 103 outputs the processed audio data as sound.

Also, the processor 198C receives haptic feedback data to be output with the notification, such as the pairing-related notification or the pairing-request notification 190, or generated upon execution of the application 1 (FIG. 1A) from the wireless communication IC 156 and provides the haptic feedback data to the processor 198C. Upon receiving the haptic feedback data, processor 198C sends a signal to the driver 198B and the driver 198B outputs a current upon receiving the signal. The mechanical component 198A vibrates according to the current to provide haptic feedback or tactile feedback to the user A, who is holding the controller 192.

FIG. 2 is a diagram of an embodiment of a system 200 to illustrate a mirroring effect of the computing device 114. The system 200 includes the components of the system 100 of FIG. 1A or the system 159 of FIG. 1D except that the system 200 includes a display device 202. An example of the display device 202 is a television or a smart television or a monitor. The display device 202 has a display screen 204, such as a light emitting diode screen or a liquid crystal display screen or a plasma display screen.

The computing device 114 communicates with the display device 202 via a wireless or a wired connection 206. For example, a dongle 252 is plugged into a high definition multimedia interface (HDMI) port of the display device 202 to allow the computing device 114 to stream media, such as video and audio frames, wirelessly from the computing device 114 to the display device 202. The video frames of the media are displayed on the display screen 204 and the audio frames on the media are output via one or more speakers of the display device 202. An example of the wired connection 206 includes an HDMI cable.

In one embodiment, in addition to outputting the media on the display device 202, the media is output by the computing device 114. For example, the video frames of the media are displayed on the display screens 116 and 204 and the audio frames are output via one or more speakers of the computing device 114 and one or more speakers of the display device 202.

When the session 106 is established between the computing device 114 and the server system 104 and before pairing of the session 106 with the controller 164, the information associated with the session 106, such as an image of a title of the game, is displayed first on the display screen 116 of the computing device 114. A processor of the computing device 114 streams or sends the media having the information associated with the session 106 to the display device 202 via the wired or wireless connection 206. A GPU of the display device 202 displays images of the information associated with the session 106 on the display screen 204 and the one or more speakers of the display device 202 output sounds having the information associated with the session 106 or output sounds having other information in synchronization with the information associated with the session 106.

Moreover, when the notification, such as the pairing-related notification or the pairing-request notification, is displayed on the computing device 114, the notification is streamed or sent from the processor of the computing device 114 to the display device 202 via the wired or wireless connection 206. The GPU of the display device 202 displays the notification on the display screen 204. Moreover, an audio processor of the display device 202 outputs sounds of the notification via the one or more speakers of the display device 202.

Figure 3:
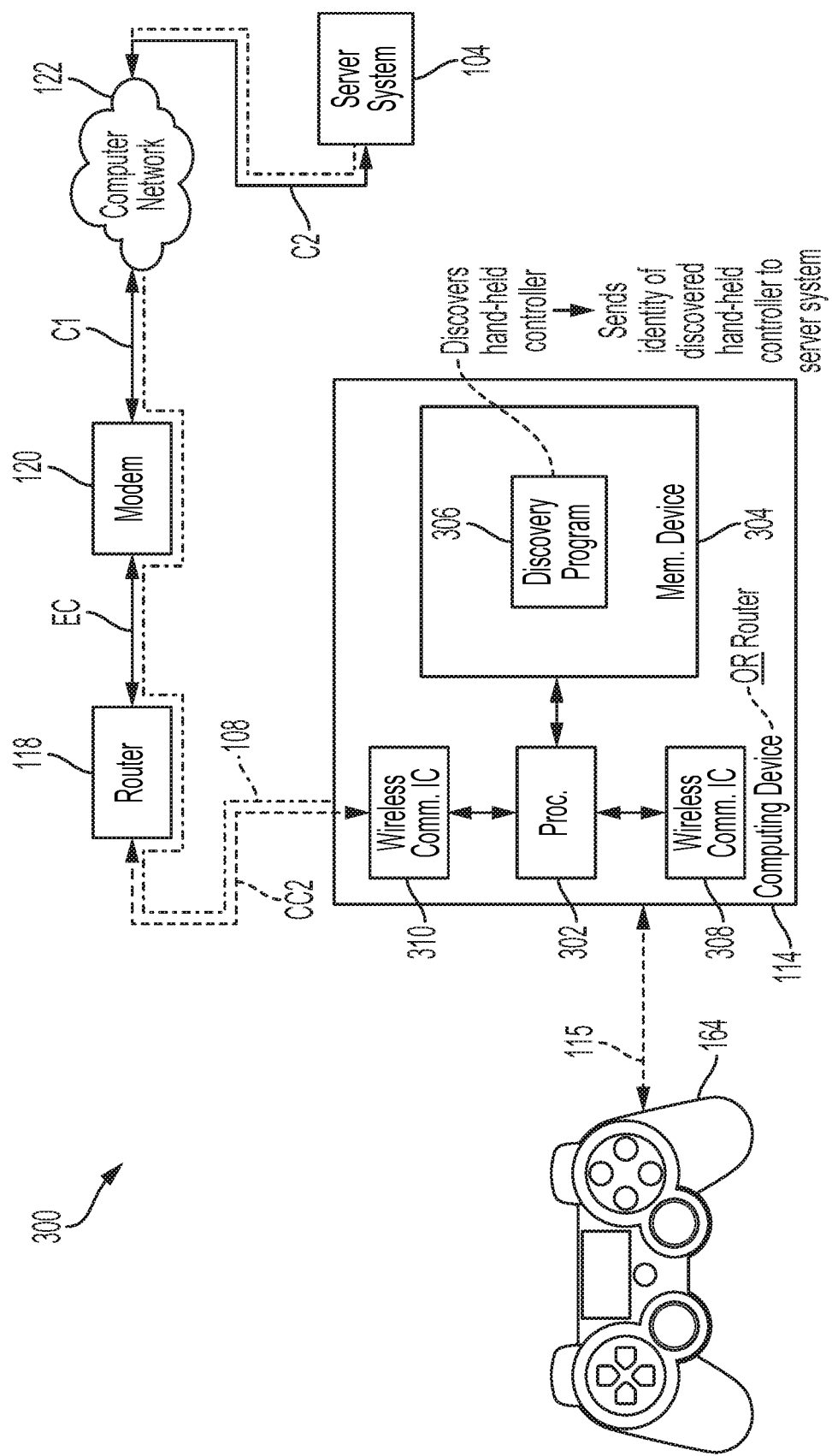
FIG. 3 is a diagram of an embodiment of a system to illustrate an execution of a discovery program for discovering a device ID of the controller of FIG. 1E.

FIG. 3 is a diagram of an embodiment of a system 300 to illustrate an execution of a discovery program 306 for discovering the device ID of the controller 164. The computing device 114 includes a processor 302, a memory device 304, a wireless communication IC 308, and a wireless communication IC 310. The wireless communication IC 310 applies the wireless communication protocol to one or more communication packets received from the computing device 114 via the connection channel CC2 to extract data from the communication packets and to data that is to be transferred from the processor 302 via the connection channel CC2 to the computing device 114 to generate one or more communication packets. Examples of the wireless communication IC 308 include a Bluetooth™ device that enables communication between the controller 164 and the computing device 114 (FIG. 1A). The processor 302 is coupled to the memory device 304 and to the wireless communication IC 308. The discovery program 306 is stored within the memory device 304. The processor 302 is coupled to the memory device 304, the wireless communication IC 310, and the wireless communication IC 308.

When the session 106 of execution of the application 1 is established between the computing device 114 and the server system 104 and before the session 106 is paired with the controller 164, the processor 302 executes the discovery program 306 to request the device ID of the controller 164 from the controller 164. The processor 194 (FIG. 1B or 1D) of the controller 164 retrieves the device ID from the device ID chip 158 and provides the device ID to the wireless communication IC 157 (FIG. 1B or 1D). The wireless communication IC 157 applies a wireless communication protocol, such as a Bluetooth™ protocol, to the device ID, to generate one or more transfer datagrams and sends the transfer datagrams via the wireless connection 115 to the wireless communication IC 308 of the computing device 114.

The wireless communication IC 308 applies the wireless communication protocol to the one or more transfer datagrams received from the controller 164 to extract the device ID from the transfer datagrams and provides the device ID to the processor 302. The processor 302 generates an instruction to send the device ID to the server system 104. The processor 302 sends the instruction and the device ID to the wireless communication IC 310, which applies the wireless communication protocol to the device ID and the instruction to generate one or more communication packets and sends the communication packets via the connection channel CC2 to the router 118.

The router 118 applies the wireless communication protocol to the communication packets to obtain the device ID and the instruction, directs the device ID and the instruction to the modem 120. The modem 120 applies the network communication protocol to the device ID and the instruction to generate one or more transfer packets and sends the transfer packets via the connection C1, the computer network 122, and the connection C2 to the server system 104.

Figure 4A:
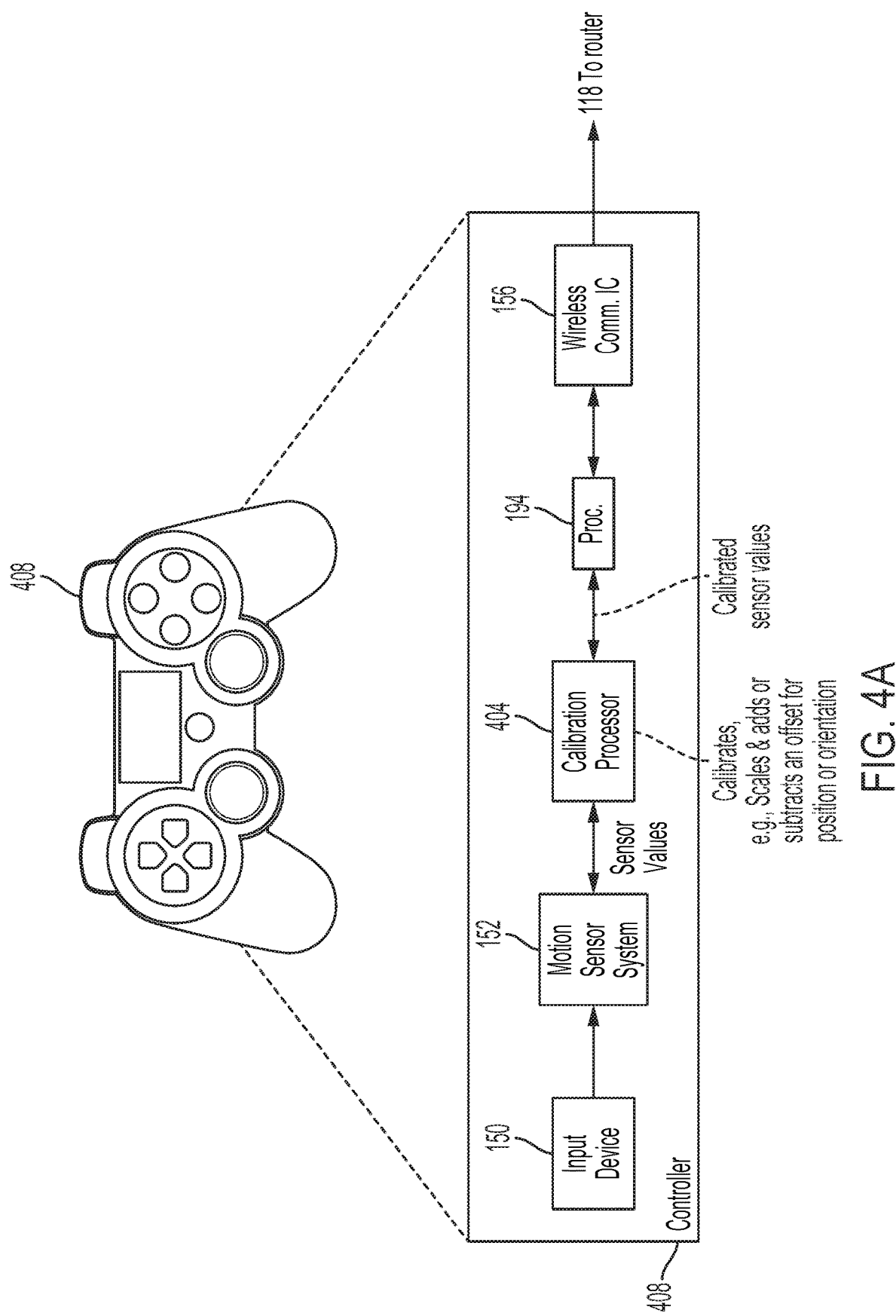
FIG. 4A is a diagram of an embodiment of a controller to illustrate use of a calibration processor within a controller.

FIG. 4A is a diagram of an embodiment of a controller 408 to illustrate use of a calibration processor 404 within the controller 408. The controller 408 is an example of the controller 102 of FIG. 1A or the controller 164 of FIG. 1E or the controller 192 of FIG. 1F-2. To illustrate, the controller 408 includes the components of the controller 102. The controller 408 includes the motion sensor system 152, the calibration processor 404, the processor 194, and the wireless communication IC 156. The calibration processor 404 is coupled to the motion sensor system 152 and to the processor 194.

The motion sensor system 152 measures sensor values, such as data for calculating a position and orientation of the controller 408, or data for calculating the position and orientation of the input device 150 of the controller 408, or a combination thereof and provides the sensor values to the calibration processor 404. For example, the motion sensor system 152 measures an acceleration of the controller 408 and an orientation of the controller 408 with respect to a reference co-ordinate system of the controller 408. As another example, the motion sensor system 152 measures an acceleration of the input device 150 and an orientation of the input device 150 with respect to the reference co-ordinate system of the controller 408.

The calibration processor 404 receives the sensor values from the motion sensor system 152 and calibrates one or more of the sensor values. For example, the calibration processor 404 scales, such as multiplies, adds, or subtracts, a factor to the sensor values to output calibrated sensor values, which are an example of the input information described above with reference to FIG. 1B. An example of the factor includes a real number. To illustrate, when the controller 408 moves from a position P1 to a position P2, which are 2 inches apart, the calibration processor 404 scales a distance between the positions P1 and P2 to be less than 2 inches apart or greater than 2 inches apart. As another illustration, when the input device 150 moves from a position P01 to a position P02, which are 1 centimeter apart, the calibration processor 404 scales a distance between the positions P01 and P02 to be less than 1 centimeter apart or greater than 1 centimeter apart.

The calibrated sensor values are provided by the calibration processor 404 to the processor 194, which generates an instruction to send the calibrated sensor values to the server system 104. The processor 194 sends the instruction and the calibrated sensor values to the wireless communication IC 156. The wireless communication IC 156 generates one or more transfer units incorporating the instruction and the calibrated sensor values by applying the network communication protocol and sends the transfer units to the router 118. The router 118 applies the wireless communication protocol to obtain the instruction and the calibrated sensor values, and sends the instruction and the calibrated sensor values to the modem 120 (FIG. 1A). The modem 120 applies the network communication protocol to the calibrated sensor values to generate one or more transfer packets, and sends the transfer packets via the communication channel 108 (FIG. 1A) to the server system 104 (FIG. 1A). The calibration of the sensor values at the controller 408 reduces a workload of the server system 104 of FIG. 1A.

Figure 4B:
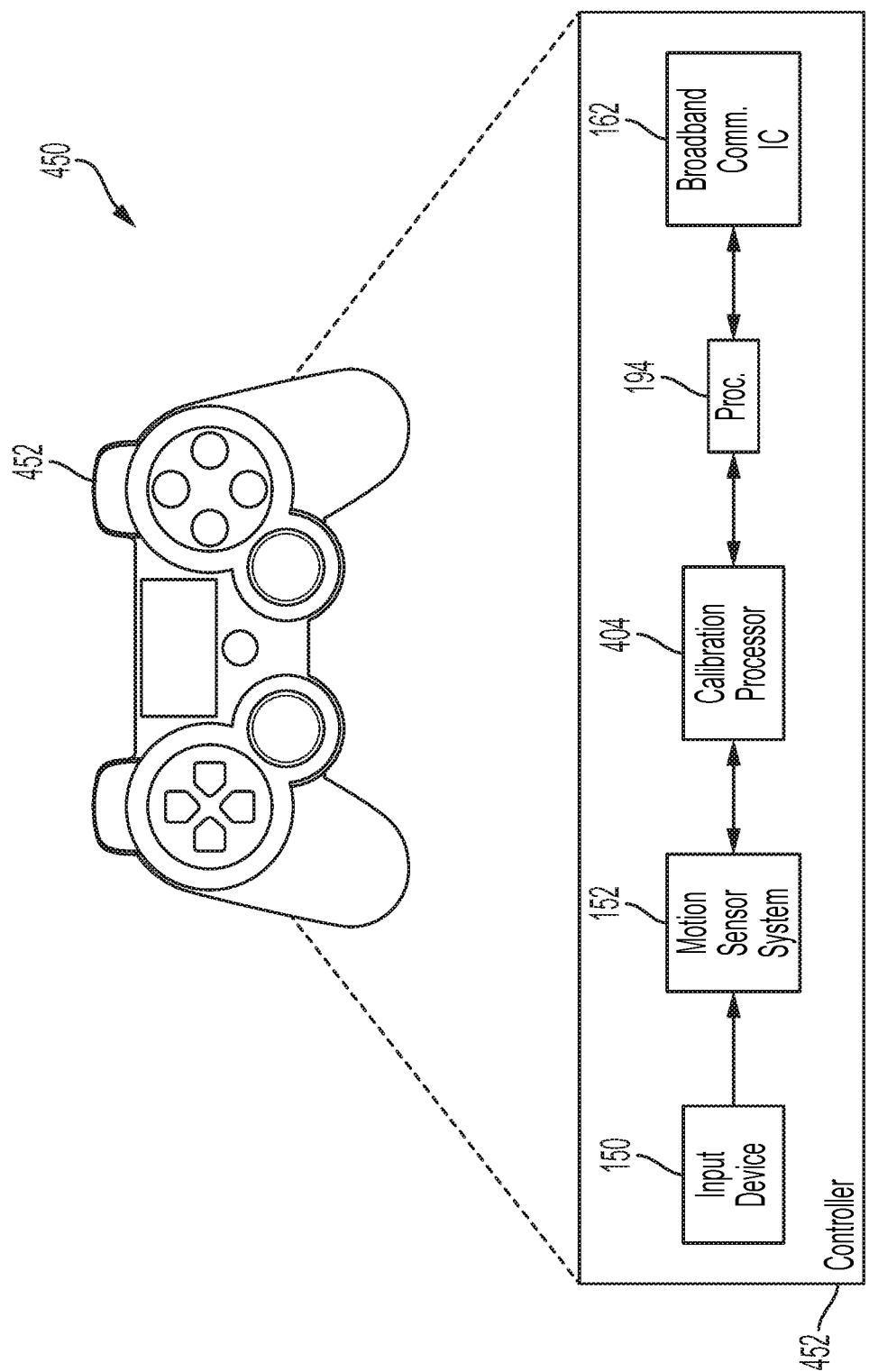
FIG. 4B is a diagram of an embodiment of a controller to illustrate use of the calibration processor within the controller.

FIG. 4B is a diagram of an embodiment of a controller 450 to illustrate use of the calibration process 404 within the controller 450. The controller 450 is an example of the controller 160 of FIG. 1C or the controller 164 of FIG. 1E or to controller 192 of FIG. 1F-2. The controller 450 includes the motion sensor system 152, the calibration processor 404, the processor 194, and the broadband communication IC 162.

The calibrated sensor values are provided by the calibration processor 404 to the processor 194, which generates an instruction to send the calibrated sensor values to the server system 104. The processor 194 sends the instruction and the calibrated sensor values to the broadband communication IC 162. The broadband communication IC 162 generates one or more transfer units incorporating the calibrated sensor values and the instruction by applying the cellular communication protocol and sends the one or more transfer units via the cellular network 154 (FIG. 1C) to the server system 104 (FIG. 1C). The calibration of the sensor values at the controller 450 reduces a workload of the server system 104 of FIG. 1C.

Figure 5:
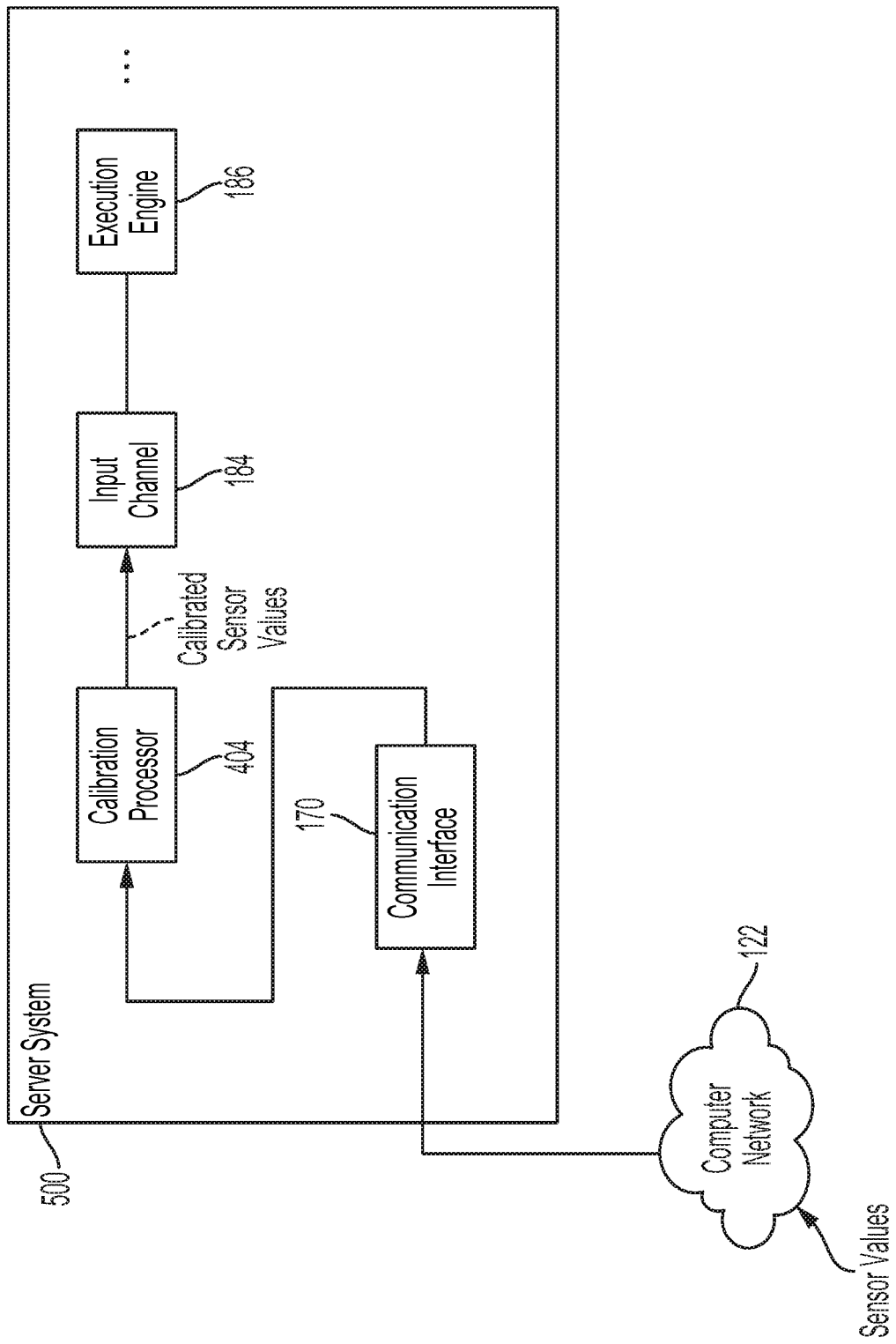
FIG. 5 is a diagram of an embodiment of a server system to illustrate calibration of the sensor values by the calibration processor of the server system.

FIG. 5 is a diagram of an embodiment of a server system 500 to illustrate calibration of the sensor values by the calibration processor 404 of the server system 500. Instead of the calibration being done by a controller, the calibration is performed by the server system 500. The server system 500 is an example of the server system 104 of FIG. 1A or 1C. The server system 500 includes the components of the server system 104. The server system 500 further includes the calibration processor 404, which is coupled to the input channel 184 and to the communication interface 170.

The communication interface 170 of the server system 500 receives one or more transfer packets having the input information that further includes the sensor values and applies the network communication protocol to the transfer packets to extract the sensor values. The processor of the communication interface 170 determines that information within the transfer packets matches a structure of the sensor values and sends the sensor values to the calibration processor 404. The calibration processor 404 receives the sensor values and calibrates the sensor values to output the calibrated sensor values. The calibration processor 404 provides the calibrated sensor values via the input channel 184 to the execution engine 186. The execution engine 186 applies the calibrated sensor values during execution of the application 1 to change the state of the virtual scene to generate one or more frames for encoding.

Figure 6:
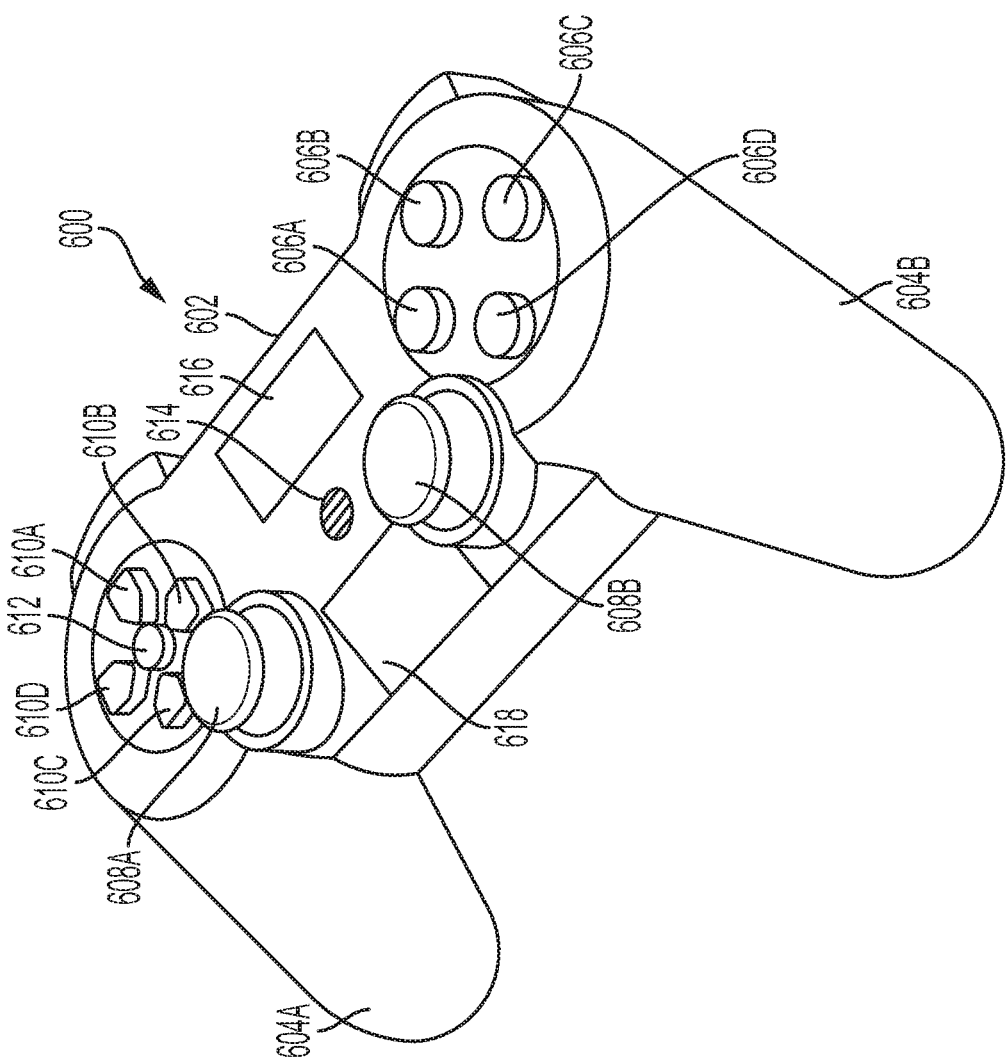
FIG. 6 illustrates a perspective view of an embodiment of a video game controller for interfacing with an interactive program.

FIG. 6 illustrates a perspective view of a video game controller 600 for interfacing with an interactive program, such as the application 1, in accordance with an embodiment of described in the present disclosure. The video game controller 600 is an example of the controller 102 of FIG. 1A or the controller 160 of FIG. 1C or the controller 164 of FIG. 1E. The video game controller 600 includes a main body 602 and extensions 604A and 604B that extend from the main body 602. The extension 604A and 604B are configured to be held by the user A's left and right hands, respectively, and thus function as handles to enable secure gripping of the video game controller 600 by the user A. On a top surface of the main body 602, there are included various input devices, such as buttons 606A, 606B, 606C, and 606D, joysticks 608A and 608B, and multiple directional pads 610A, 610B, 610C, and 610D. Also shown is the top portion of a three-dimensional (3D) control bar 612 which extends through the main body 602 of the video game controller 600 from top to bottom. A speaker 614 is provided for playing sounds which provide feedback to the user A.

Additionally, the video game controller 600 includes a touch panel 616 defined on a top side of the main body 602 which faces the head of the user A when the extensions 604A and 604B are held by the user A in the left and right hands, respectively. The touch panel 616 is oriented in a substantially horizontal fashion and situated between groups A and B so that the user A holding the extensions 604A and 604B can readily use the touch panel 616 with the thumb of either hand of the user A. The group A includes the buttons 606A, 606B, 606C, and 606D and the group B includes the directional pads 610A, 610B, 610C, and 610D. The touch panel 616 utilizes a touch-sensitive technology (e.g. resistive, capacitive, etc.) to detect touch gestures made by the user A. In the illustrated embodiment, the touch panel 616 provides a tactile sensation by virtue of its shape that enables the user A to readily determine an approximate vertical position of his/her thumb on the touch panel 616 based on feeling alone.

The video game controller 600 includes a fingerprint pad 618 that receives a touch of one or more fingers of the user A to output the biometric ID, described above. The fingerprint pad 618 is an example of the fingerprint reader, described above. The fingerprint pad 618 is located between the joysticks 608A and 608B and below the touch panel 616.

In one embodiment, the fingerprint pad 618 is located on any other location on the controller 600. For example, the fingerprint pad 618 is integrated within the touch panel 616. As another example, a fingerprint pad is integrated within a surface of the extension 604A or a surface of the extension 604B or within both the surfaces. As yet another example, the touch panel 616 is a part of a display screen, such as a liquid crystal display or a light emitting diode display or a plasma display, and the fingerprint pad 618 is integrated within the display screen. As still another example, a fingerprint pad is integrated within a top surface of either the joystick 608A or the joystick 608B or multiple fingerprint pads are integrated on surfaces of the joysticks 608A and 608B. As yet another example, the fingerprint pad 618 is located on a back side of the controller 600.

In one embodiment, the video game controller 600 includes one or more microphones for capturing sound from the real-world environment. As an example, the microphones are arranged as an array of microphones. The arrangement is a linear array of microphones. When three or more microphones are included in the array of microphones, it is possible to determine a location of a sound source relative to the microphone array based on analysis of audio data captured by the microphone array. More specifically, the sound source can be localized relative to the microphone array based on a relative timing of its sound as captured by each of the microphones of the microphone array. Taken in combination with the a location and an orientation of the video game controller 600 (e.g. as determined based on the motion sensor system 152 of FIGS. 1B and 1D and tracking methods as defined elsewhere herein), and by extension the location and orientation of the microphone array, a location of the sound source within the interactive environment can be determined. Furthermore, the captured sound can be processed to exclude sounds which do not emanate from a certain region of the real-world environment. The sound of the user A is captured by the microphones to output the biometric information, described above.

Figure 7:
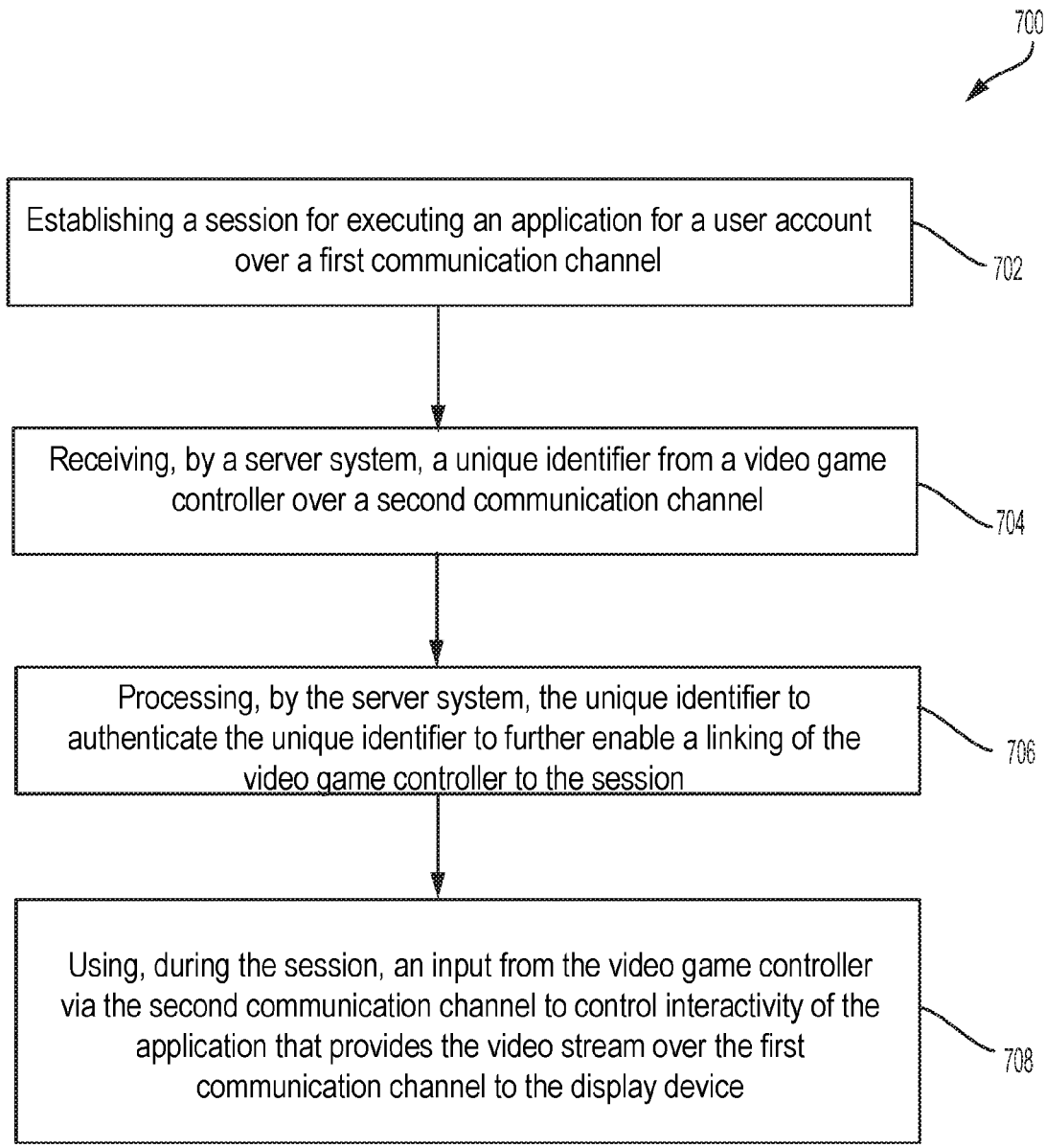
FIG. 7 is a flowchart of an embodiment of a method to illustrate pairing of a controller with a session.

FIG. 7 is a flowchart to illustrate an embodiment of a method 700 for establishing direct communication between a server system and a video game controller. The method includes an operation 702 of establishing a session for executing an application for a user account over a first communication channel. The execution of the application at the server system produces a video output that is encoded to produce a video stream that is communicated to a display device associated with the user account over the first communication channel. The method 700 further includes an operation 704 of receiving, by the server system, a unique identifier from the video game controller over a second communication channel The method 700 also includes an operation 706 of processing, by the server system, the unique identifier to authenticate the unique identifier. The unique identifier is authenticated to enable a linking of the video game controller to the session. The method 700 includes an operation 708 of using, during the session, an input from the video game controller via the second communication channel to control interactivity of the application that provides the video stream over the first communication channel to the display device.

Figure 8:
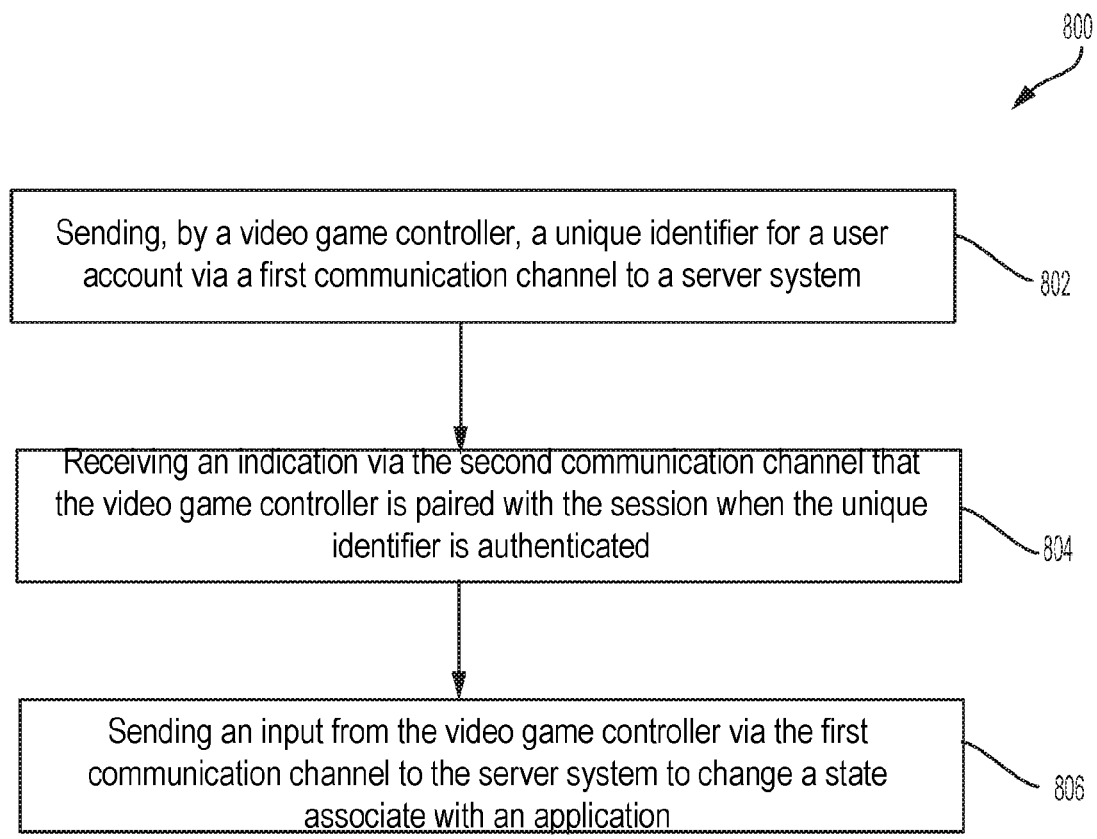
FIG. 8 is a flowchart of an embodiment of a method to illustrate pairing of a controller with a session.

FIG. 8 is a flowchart 800 to illustrate an embodiment of a method 800 for establishing direct communication with a server system. The method includes an operation 802 of sending, by a video game controller, a unique identifier for a user account via a first communication channel to the server system. The operation 802 of sending the unique identifier occurs after a session for executing an application is established over a second communication channel between the server system and a display device. The method 800 also includes an operation 804 of receiving an indication via the second communication channel that the video game controller is paired with the session when the unique identifier is authenticated. The method 800 includes an operation 806 of sending an input from the video game controller via the first communication channel to the server system to change a state associate with the application. The operation 806 of sending the input occurs after the operation 804 of receiving the indication.

Embodiments described in the present disclosure may be practiced with various computer system configurations including hand-held devices, microprocessor systems, microprocessor-based or programmable consumer electronics, minicomputers, mainframe computers and the like.

Several embodiments described in the present disclosure can also be practiced in distributed computing environments where tasks are performed by remote processing devices that are linked through a wire-based or wireless network.

With the above embodiments in mind, it should be understood that a number of embodiments described in the present disclosure can employ various computer-implemented operations involving data stored in computer systems. These operations are those requiring physical manipulation of physical quantities. Any of the operations described herein that form part of various embodiments described in the present disclosure are useful machine operations. Several embodiments described in the present disclosure also relates to a device or an apparatus for performing these operations. The apparatus can be specially constructed for the required purpose, or the apparatus can be a computer selectively activated or configured by a computer program stored in the computer. In particular, various machines can be used with computer programs written in accordance with the teachings herein, or it may be more convenient to construct a more specialized apparatus to perform the required operations.

Various embodiments described in the present disclosure can also be embodied as computer-readable code on a non-transitory computer-readable medium. The non-transitory computer-readable medium is any data storage device that can store data, e.g., a RAM, a ROM, a flash memory, a disk, etc., which can be thereafter be read by a computer system. Examples of the computer-readable medium include hard drives, network attached storage (NAS), ROM, RAM, compact disc-ROMs (CD-ROMs), CD-recordables (CD-Rs), CD-rewritables (RWs), magnetic tapes and other optical and non-optical data storage devices. The non-transitory computer-readable medium can include computer-readable tangible medium distributed over a network-coupled computer system so that the computer-readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, or operations may be performed in a different order, as long as the processing of the overlay operations are performed in the desired way.

It should further be noted that in an embodiment, one or more features from any embodiment described above are combined with one or more features of any other embodiment without departing from a scope described in various embodiments described in the present disclosure.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the various embodiments described in the present disclosure is not to be limited to the details given herein, but may be modified within the scope and equivalents of the appended claims.

The invention claimed is:

1. A method for establishing direct communication between a server system and a video game controller, comprising:

establishing, between the server system and a computing device, a game session for executing an application for a user account over a first communication channel, wherein the computing device includes a display device, wherein the execution of the application at the server system produces video output that is encoded to produce a video stream that is communicated to the display device associated with the user account over the first communication channel, wherein the computing device is configured to provide an address of the server system associated with the game session to the video game controller;

receiving, by the server system, a unique identifier from the video game controller over a second communication channel, wherein the unique identifier is received at the address of the server system;

processing, by the server system, the unique identifier to authenticate the unique identifier, wherein the unique identifier being authenticated enables a linking of the video game controller to the game session; and using, during the game session, an input from the video game controller via the second communication channel to control interactivity of the application that provides the video stream over the first communication channel to the display device.

2. The method of claim 1, further comprising:

receiving user login information via the first communication channel from the display device;

authenticating the user login information;

wherein said establishing the game session is performed in response to authenticating the user login information, wherein said establishing the game session including providing access to the user account.

3. The method of claim 1, wherein the application is a game application, wherein said establishing the game session includes sending data for displaying a virtual game scene on the display device for identifying the game application.

4. The method of claim 1, wherein the input includes input information, the method further comprising disallowing the input information to change a state of a virtual scene until the video game controller is linked with the game session.

5. The method of claim 1, wherein said receiving the unique identifier from the video game controller over the second communication channel comprises receiving the unique identifier of the video game controller via a router, a modem, and a computer network, wherein the router and the modem are locally situated with respect to the video game controller, wherein said receiving the unique identifier is performed without using the display device and a game console.

6. The method of claim 1, wherein said receiving the unique identifier from the video game controller over the second communication channel comprises receiving the unique identifier of the video game controller via a cellular network and a computer network, wherein said receiving the unique identifier is performed without using the display device and a game console.

7. The method of claim 1, further comprising:

sending a pairing request via the first communication channel to the display device upon determining that the unique identifier is authentic, wherein the pairing request includes a notification that the video game controller is to be paired with the game session;

receiving a response to the pairing request via the second communication channel;

determining whether the response to the pairing request is positive or negative, wherein said linking of the video game controller to the game session comprises pairing the video game controller with the game session in response to determining that the response to the request is positive, wherein said linking occurs to enable the input to processed by the server to control the interactivity of the application.

8. The method of claim 1, wherein the second communication channel includes a router coupled to a computer network, wherein the unique identifier includes an identifier of the video game controller or a biometric identification of the user or an identifier of the router, or a combination of two or more thereof.

9. The method of claim 1, wherein said processing the unique identifier comprises determining whether the unique identifier matches a pre-registered identifier registered with the user account for which the game session is established, wherein the unique identifier is different from user login information used to access the game session for the user account,
wherein said linking of the video game controller to the game session comprises pairing the video game controller with the game session in response to determining that the unique identifier matches the pre-registered identifier, wherein said pairing occurs to enable the input to be processed by the server to control the interactivity of the application.

10. The method of claim 1, wherein said linking occurs to enable the input to be processed by the server to control the interactivity of the application, wherein the game session includes an instance of the game session.

11. The method of claim 1, further comprising:
receiving the input from the video game controller via the second communication channel;
determining a state of a virtual scene according to the input;
generating a plurality of frames based on the state of the virtual scene;
encoding the frames to output a plurality of encoded frames;
sending the encoded frames via the first communication channel to the display device.

12. The method of claim 1, wherein the video game controller is a hand-held controller and has a different internet protocol (IP) address than an IP address of the display device.

13. The method of claim 1, wherein the first communication channel includes a router and a modem.

14. The method of claim 1, wherein the second communication channel bypasses the computing device.

15. A system for establishing direct communication between a server and a video game controller, comprising:
a processor of the server, wherein the processor is configured to establish a game session with a computing device for executing an application for a user account over a first communication channel; and
a video game controller coupled to the server via a second communication channel, wherein the computing device is configured to provide an address of the server associated with the game session to the video game controller, wherein the video game controller is configured to send a unique identifier over the second communication channel to the processor at the address of the server,
wherein upon receiving the unique identifier, the processor is configured to:
process the unique identifier to authenticate the unique identifier, wherein the unique identifier being authenticated establishes a link of the video game controller to the game session; and
enable an input from the video game controller via the second communication channel to control interactivity of the application with a display device of the computing device, wherein the interactivity of the application with the display device occurs to provide video and audio via the first communication channel to the display device.

16. The system of claim 15, wherein the first communication channel includes a modem, a router, and a computer network, wherein in response to establishing the link between the video game controller and the game session, the one or more processors are further configured to send data to the display device for displaying a virtual scene on the display device via the computer network, the router, and the modem to an internet protocol (IP) address of the display device, wherein the modem and the router are locally situated with respect to the display device.

17. The system of claim 15, wherein the one or more processors are configured to:
send a pairing request via the first communication channel to the display device upon determining that the unique identifier is authentic, wherein the pairing request includes a notification that the video game controller is to be paired with the game session;
receive a response to the pairing request via the second communication channel;
determine whether the response to the pairing request is positive or negative,
wherein the link is established to pair the video game controller with the game session, wherein the video game controller is paired with the game session in response to determining that the response to the pairing request is positive, wherein the video game controller is paired with the game session to enable the input from the video game controller to be processed to control the interactivity of the application with the display device.

18. The system of claim 15, wherein to process the unique identifier, the one or more processors are configured to determine whether the unique identifier matches a pre-registered identifier registered with the user account for which the game session is established, wherein the unique identifier is different from login information used to access the game session for the user account.

19. A method for establishing direct communication with a server system, comprising:
receiving, by a video game controller, an address of the server system associated with a game session from a computing device;
sending, by the video game controller, a unique identifier for a user account via a first communication channel to the server system, wherein the unique identifier is sent by the video game controller via the first communication channel to the server system at the address of the server system, wherein said sending the unique identifier occurs after the game session for executing an application is established over a second communication channel between the server system and a display device of the computing device;
receiving, by the computing device, an indication via the second communication channel that the video game controller is paired with the game session when the unique identifier is authenticated; and
sending an input from the video game controller via the first communication channel to the server system to change a state associate with the application, wherein said sending the input occurs after said receiving the indication.

20. The method of claim 19, wherein the second communication channel includes a router that is local to the video game controller, wherein the unique identifier includes an identifier of the video game controller, or a biometric identification of a user, or an identification of the router, or a combination of two or more thereof.

21. The method of claim 19, wherein said sending the unique identifier includes sending the unique identifier via a router, a modem, and a computer network to the server system without using a game console.

22. The method of claim 19, wherein the first communication channel includes a cellular network and a computer network and the second communication channel includes the computer network.

* * * * *